United States Patent [19]
Nishimura et al.

[11] Patent Number: 5,754,099
[45] Date of Patent: May 19, 1998

[54] OBSTACLE WARNING SYSTEM FOR A VEHICLE

[75] Inventors: Takao Nishimura, Nagoya; Katsuhiko Hibino, Toyoake; Noriaki Shirai, Oobu, all of Japan

[73] Assignee: Nippondenso Co., Ltd., Kariya, Japan

[21] Appl. No.: 410,638

[22] Filed: Mar. 24, 1995

[30] Foreign Application Priority Data

Mar. 25, 1994 [JP] Japan .................... 6-055967
Apr. 26, 1994 [JP] Japan .................... 6-088645

[51] Int. Cl.$^6$ ...................................... B60Q 1/00
[52] U.S. Cl. .................. 340/435; 340/903; 342/70; 364/461
[58] Field of Search ................ 340/435, 903; 342/70; 364/461

[56] References Cited

U.S. PATENT DOCUMENTS

| | | | |
|---|---|---|---|
| 4,833,469 | 5/1989 | David | 340/435 |
| 5,023,617 | 6/1991 | Deering | 342/70 |
| 5,249,157 | 9/1993 | Taylor | 340/435 |
| 5,291,207 | 3/1994 | Kikuchi et al. | 342/70 |
| 5,461,357 | 10/1995 | Yoshioka et al. | 340/435 |
| 5,467,283 | 11/1995 | Butsuen et al. | 340/435 |
| 5,475,494 | 12/1995 | Nishida et al. | 340/435 |
| 5,530,651 | 6/1996 | Uemura et al. | 340/435 |

FOREIGN PATENT DOCUMENTS

| | | |
|---|---|---|
| 5 2071 | 1/1993 | Japan . |
| 5180933 | 7/1993 | Japan . |
| 5180934 | 7/1993 | Japan . |

Primary Examiner—Jeffery Hofsass
Assistant Examiner—Daveita Woods
Attorney, Agent, or Firm—Cushman Darby & Cushman IP Group of Pillsbury Madison & Sutro LLP

[57] ABSTRACT

An obstacle warning system for a vehicle includes a distance measuring device for emitting a transmission wave or laser light in a given angular range in a direction of a width of the vehicle in a scanning manner, and for detecting a distance between the vehicle and an obstacle in correspondence with a scan angle on the basis of a reflected wave or reflected light from the obstacle. A relative position calculating device calculates a relative position of the obstacle with respect to the vehicle on the basis of the distance detected by the distance measuring device and a corresponding scan angle. A radius calculating device calculates a radius of an estimated relative curved path of the vehicle with respect to the obstacle on the basis of relative positions of at least two points of the obstacle which are calculated by the relative position calculating device. A warning area setting device sets a given warning area on the basis of the width of the vehicle and the radius calculated by the radius calculating device. A warning device executes a given warning process if the obstacle remains in the warning area for a given period of time.

9 Claims, 23 Drawing Sheets

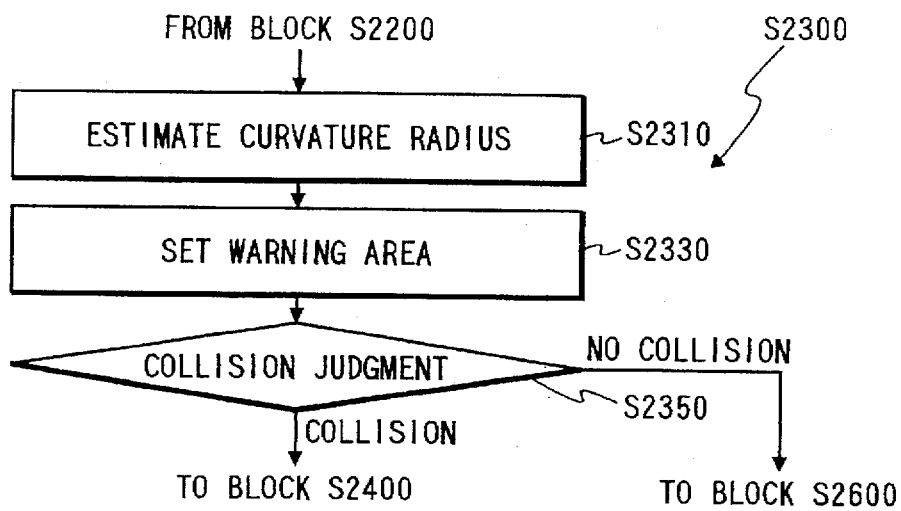
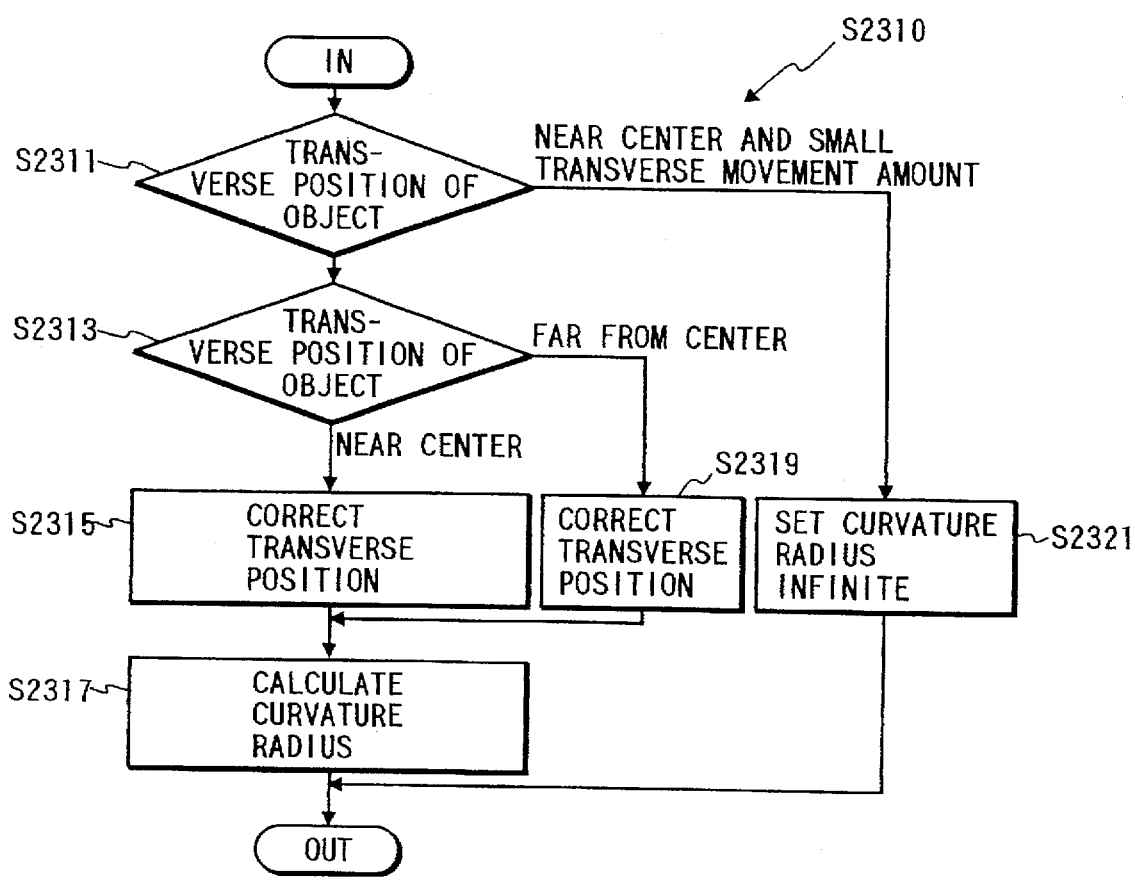

OBJECT NOT COLLIDING

OBJECT COLLIDING

OBSTACLE WARNING SYSTEM FOR A VEHICLE

BACKGROUND OF THE INVENTION

1. Field of the Invention

This invention generally relates to an obstacle warning system for a vehicle. This invention specifically relates to a system for a vehicle which generates a collision-avoidance alarm when the vehicle moves into proximity with an obstacle or a preceding vehicle.

2. Description of the Prior Art

In some known forward obstacle warning systems for a vehicle, the distance between the subject vehicle and an obstacle or a preceding vehicle ahead of the subject vehicle is detected, and an alarm is generated in response to the detected distance when there is a possibility of collision between the subject vehicle and the obstacle or the preceding vehicle. The detection of the distance generally involves emitting a laser light beam or a radio wave beam forward of the subject vehicle, receiving a reflected or echo beam from the obstacle or the preceding vehicle, detecting the time interval between the moment of emission of the beam and the moment of reception of the reflected beam, and measuring the distance in response to the detected time interval.

A first case requiring an alarm is when a subject vehicle moves into proximity of a stationary obstacle such as a stationary vehicle in front of the subject vehicle. A second case requiring an alarm is when a subject vehicle moves into proximity to a moving obstacle, such as a moving vehicle in front of the subject vehicle. The second case occurs when a vehicle which precedes the subject vehicle decelerates relative to the subject vehicle or when a low-speed vehicle cuts in with respect to subject vehicle's lane.

For a reliable alarm, it is effective to detect the position and the speed of an obstacle relative to a subject vehicle. Japanese published unexamined patent application 5-180933 (corresponding to U.S. Pat. No. 5,291,207) and Japanese published unexamined patent application 5-180934 disclose that data of the position of an obstacle relative to a subject vehicle is periodically generated by a distance measuring unit, and the current position data and the preceding position data are compared to detect an amount of variation in the position of the obstacle. A speed of the obstacle relative to the subject vehicle is calculated from the detected amount of variation in the position of the obstacle.

Japanese published unexamined patent application 5-180933 (corresponding to U.S. Pat. No. 5,291,207) further discloses that the current position data and the preceding position data are compared to detect a direction of movement of the obstacle relative to the subject vehicle, and the position of the obstacle which will occur a given time after the present moment is estimated from the relative speed of the obstacle and the direction of movement of the obstacle.

In the case where a subject vehicle travels along one of the lanes of a curved road, the subject vehicle will generally not collide with a vehicle traveling along a lane neighboring the subject vehicle's lane, although the subject vehicle is in proximity to the neighboring vehicle. In the case where a subject vehicle travels along one of lanes of a curved road, when a stationary vehicle occupies the subject vehicle's lane in front of the subject vehicle, although the stationary vehicle is distant from the subject vehicle, there is a high possibility of collision between the subject vehicle and the stationary vehicle.

U.S. Pat. No. 5,023,617 discloses a vehicle forward sensor antenna steering system. In the system of U.S. Pat. No. 5,023,617, a transmitted and received beam of a forward looking sensor of a source vehicle is steered as the source vehicle travels through a curvilinear path. Thus, the steering angle is controlled to prevent the loss of detection of a target vehicle resulting from the effective lateral shift of the beam relative to the path as the beam is steered into the curvilinear path. The beam is steered at an angle that limits the effective lateral shift of the beam relative to the curvilinear path such that a predetermined minimum target vehicle detection criteria is achieved.

SUMMARY OF THE INVENTION

It is an object of this invention to provide an improved obstacle warning system for a vehicle.

A first aspect of this invention provides an obstacle warning system for a vehicle which comprises a distance measuring system for emitting transmission wave or laser light into a given angular range in a direction of a width of the vehicle in a scanning manner, and for detecting a distance (L) between the vehicle and an obstacle in correspondence with a scan angle (θ) on the basis of reflected wave or reflected light from the obstacle; a relative position calculating unit calculating a relative position (X, Y) of the obstacle with respect to the vehicle on the basis of the distance (L) detected by the distance measuring means and a corresponding scan angle (θ); a radius calculating unit calculating a radius (Re) of an estimated relative curved path of the vehicle with respect to the obstacle on the basis of relative positions of at least two points of the obstacle which are calculated by the relative position calculating unit; warning area setting unit setting a given warning area (WA1) on the basis of the width of the vehicle and the radius (Re) calculated by the radius calculating unit; and a warning system executing a given warning in cases where the obstacle remains in the warning area (WA1) for a given time.

Examples of the obstacle are another vehicle preceding the subject vehicle, a stationary vehicle, a guardrail at a road side, and a pole.

A second aspect of this invention is based on the first aspect of this invention, and provides an obstacle warning system wherein the radius calculating unit calculates the radius (Re) of the estimated relative curved path of the vehicle on the basis of two correction-resultant relative positions which are derived from relative positions (X, Y) of at least three points of the obstacle by, for example, a least square method.

A third aspect of this invention is based on the first aspect of this invention, and provides an obstacle warning system further comprising a straight travel assuming unit that regards a straight traveling condition as being present in cases where an amount of movement of the obstacle relative to the vehicle in the direction of the width of the vehicle is equal to or smaller than a given value, and where the obstacle is in a given area in direct front of the vehicle on the basis of relative positions (X, Y) of at least two points of the obstacle which are calculated by the relative position calculating unit; wherein in cases where the straight travel assuming unit regards a straight traveling condition as being present, the radius calculating unit regards the radius (Re) as being infinite without executing a normal radius calculating process while the warning area setting unit sets the given warning area (WA1) on the basis of the infinite radius (Re) and the width of the vehicle.

A fourth aspect of this invention is based on the first aspect of this invention, and provides an obstacle warning system wherein in cases where at least a part of the obstacle relatively moves from the given angular range which can be scanned by the distance measuring system to a region outside the given angular range, the relative position (X, Y) of the obstacle is calculated in the relative position calculating unit as a position corresponding to an edge of the obstacle closer to the vehicle before at least the part of the obstacle relatively moves to the region outside the given angular range.

A fifth aspect of this invention is based on the first aspect of this invention, and provides an obstacle warning system wherein in cases where a width of the obstacle which is recognized on the basis of the relative position thereof corresponds to a given vehicle width and corresponds to a width of a vehicle reflector, a method of calculation of the radius of the estimated curved path is changed in response to a rate of data corresponding to the width of the vehicle reflector with respect to all data.

A sixth aspect of this invention is based on the first aspect of this invention, and provides an obstacle warning system further comprising a vehicle speed detecting system for detecting a speed (V) of the vehicle a; relative speed calculating unit for calculating a relative speed (Vr) of the obstacle with respect to the vehicle on the basis of the relative position calculated by the relative position calculating means; a motion judgment unit for judging whether the obstacle is moving or stationary on the basis of the relative speed (Vr) of the obstacle and the speed (V) of the vehicle; and a second warning system executing a given warning process in cases where the obstacle is found to be moving by the motion judgment unit and the obstacle remains in a given auxiliary warning area (WA2) set with respect to the vehicle for a given time even when the given warning process based on the warning area (WA1) is not executed by the second warning system.

A seventh aspect of this invention is based on the sixth aspect of this invention, and provides an obstacle warning system wherein the given auxiliary warning area is variably set with respect to the vehicle and on the basis of a standard vehicle speed assumed in consideration of a road shape.

An eighth aspect of this invention provides an obstacle warning system for a vehicle which comprises a distance measuring system for emitting transmission wave or laser light into a given angular range in a direction of a width of the vehicle in a scanning manner, and for detecting a distance (L) between the vehicle and an obstacle in correspondence with a scan angle (θ) on the basis of reflected wave or reflected light from the obstacle; a relative position calculating unit calculating a relative position (Xp, Yp) of the obstacle with respect to the vehicle on the basis of the distance (L) detected by the distance measuring system and a corresponding scan angle (θ) as an X-Y coordinate data in which a position of the vehicle is defined as an origin, and a direction of the width of the vehicle is defined as an X axis and a longitudinal direction of the vehicle is defined as a Y axis; warning area setting unit setting a warning area (WA) having a triangular shape defined by straight lines connecting a point (Xp, Yp) of the relative position of the obstacle which is calculated by the relative position calculating means, the origin (0, 0), and a given point (0, Yq) on the Y axis; and warning system for executing a given warning process in cases where the obstacle remains in the warning area for a given time after the warning area (WA) is set.

Examples of the obstacle are another vehicle preceding the subject vehicle, a stationary vehicle, a guardrail at a road side, and a pole.

A ninth aspect of this invention is based on the eighth aspect of this invention, and provides an obstacle warning system wherein the given point (0, Yq) on the Y axis for the setting of the warning area (WA) by the warning area setting unit is variably set on the basis of Y coordinate data of the relative position (Xp, Yp) of the obstacle.

A tenth aspect of this invention is based on the eighth aspect of this invention, and provides an obstacle warning system wherein in cases where an absolute value of an X coordinate of the relative position (Xp, Yp) of the obstacle is equal to or greater than a given value (Xm) during the setting of the warning area (WA) by the warning area setting unit, a part of the warning area (WA) which is in a region equal to or greater than the given value (Xm) is deleted.

An eleventh aspect of this invention is based on the eighth aspect of this invention, and provides an obstacle warning system wherein in cases where an absolute value of an X coordinate of the relative position (Xp, Yp) of the obstacle is equal to or smaller than a given value (Xn) during the setting of the warning area (WA) by the warning area setting unit, a new warning area (WAa) in a region equal to or smaller than the given value (Xn) is added to the warning area (WA).

A twelfth aspect of this invention is based on the eleventh aspect of this invention, and provides an obstacle warning system wherein in cases where an absolute value of an X coordinate of the relative position (Xp, Yp) of the obstacle is equal to or smaller than the given value (Xn), a warning area (WAn) having a triangular shape is set which is defined by straight lines connecting the point (Xp, Yp) of the relative position of the obstacle and two points {(Xn, 0), (−Xn, 0)} on the X axis which have absolute values equal to the given value (Xn), and thereby the addition of the new warning area (WAa) is executed.

A thirteenth aspect of this invention provides a warning system for a vehicle which comprises a system for periodically detecting a position of an obstacle relative to the vehicle; a system estimating a trajectory of the vehicle relative to the obstacle in response to the position of the obstacle periodically detected by the first means calculating a radius of a curvature of the trajectory estimated by the second means, setting a warning area in response to the radius calculated by the third means, and and detecting whether or not the position of the obstacle periodically detected by the first means remains in the warning area set by the fourth means during a given time; an alarm system generating an alarm in cases where the position of the obstacle remains in the warning area during the given time and inhibiting generation of an alarm in cases where the position of the obstacle does not remain in the warning area during the given time.

In the obstacle warning system according to the first aspect of this invention, the distance measuring system is operative for emitting transmission wave or laser light into a given angular range in a direction of a width of the vehicle in a scanning manner, and for detecting a distance (L) between the vehicle and an obstacle in correspondence with a scan angle (θ) on the basis of reflected wave or reflected light from the obstacle. The relative position calculating unit is operative for calculating a relative position (X, Y) of the obstacle with respect to the vehicle on the basis of the distance (L) detected by the distance measuring system and a corresponding scan angle (θ). The radius calculating unit is operative for calculating a radius (Re) of an estimated relative curved path of the vehicle with respect to the obstacle on the basis of relative positions of at least two points of the obstacle which are calculated by the relative position calculating unit. The warning area setting unit is operative for setting a given warning area (WA1) on the basis of the width of the vehicle and the radius (Re) calculated by the radius calculating unit. The warning system is operative for executing a given warning process in cases where the obstacle remains in the warning area (WA1) for a given time.

The distance measuring system is able to detect a distance (L) between the vehicle and an obstacle in correspondence with a scan angle (θ) in the given angular range in the direction of the width of the vehicle. The scanning enables detection of an obstacle in a wide range, prevention of missing an obstacle during travel along a curved path, and detection of transverse movement of the obstacle. Accordingly, the scanning can decrease the possibility of generation of a wrong alarm and enhance the warning ability in conjunction with the warning process described later.

Even in the case of a curved road, a suitable alarm can be generated for the following reasons. Calculation is made as to a radius (Re) of an estimated relative curved path of the vehicle with respect to the obstacle, and a given warning area (WA1) is set on the basis of the width of the vehicle and the radius (Re). A given warning process is executed in cases where the obstacle remains in the warning area (WA1) for a given time.

In the case where the obstacle is stationary, the calculated radius (Re) exactly agrees with a radius of an estimated curved path of the vehicle. In the case where the obstacle is moving, the calculated radius (Re) agrees with a radius of an estimated relative curved path of the vehicle with respect to the obstacle. Thus, even in the case where the subject vehicle travels along a straight path, an estimated curved path occurs when a low-speed preceding vehicle cuts in with respect to subject vehicle's lane from a neighboring lane.

In the case where the obstacle agrees with a stationary object, the radius (Re) is calculated as follows. As the subject vehicle travels along a curve, the stationary object approaches the subject vehicle along a circular path. Because the stationary object does not move, the radius (Re) of the estimated relative curved path of the subject vehicle can be calculated from only the relative position of the stationary object with respect to the subject vehicle. FIG. 33 shows the relative position of the stationary object at X and Y coordinates where the position of the subject vehicle is defined as an origin while the direction of the width of the subject vehicle and the longitudinal direction of the subject vehicle are defined as an X axis and a Y axis respectively. The points "A" and "B" of the relative position of the stationary object exist on the circumference of a circle concentric with a circle having a curvature radius (Re). The center "C" of the circle having the curvature radius (Re) exists on the X axis. Therefore, the triangle "ABC" agrees with an equilateral triangle in which "AC"="BC". Thus, the curvature radius (Re) can be determined by the positions of the points "A" and "B".

The warning area (WA1) is set on the basis of the radius (Re) and the width of the subject vehicle. The width of the warning area was is set an area of a width equal to a minimum vehicle width. It is preferable to provide a clearance in setting of the area since there is a chance of contact when the area width is set equal to the vehicle width. In the case where the subject vehicle travels along a straight path, the radius is set infinite so that similar processes can be applied. FIG. 34 shows an object at a road side which will not collide with the subject vehicle. FIG. 35 shows a stationary vehicle which will collide with the subject vehicle. Under the conditions shown in FIG. 34, because the road side object exists outside the warning area (WA1), a possible collision is regarded as being absent and a warning process is not executed. On the other hand, under the conditions shown in FIG. 35, because the stationary vehicle exists within the warning area (WA1), a possible collision is regarded as being present and a warning process is executed.

The above-indicated method of calculation of the curvature radius which relates to the stationary object can also be applied to the case where the obstacle agrees with a moving object. In this case, the curvature radius (Re) means a radius of an estimated relative curved path of the subject vehicle with respect to the obstacle. FIG. 36 shows behaviors "a" and "b" of a preceding vehicle ahead of the subject vehicle. FIG. 37 shows estimated curves corresponding to the behaviors "a" and "b" in FIG. 36. FIG. 38 shows behaviors "c", "d", "e", and "f" of a vehicle which continues to travel along a lane neighboring the subject vehicle's lane or which cuts in with respect to the subject vehicle. FIG. 39 shows estimated curves corresponding to the behaviors "c","d", "e", and "f" in FIG. 38. Also in the case where the obstacle is a moving object, the curvature radius is estimated and the warning area (WA1) is set similarly to the case of a stationary object. A judgment is made as to whether or not the obstacle remains in the warning area (WA1) for a given time. Thereby, it is possible to execute a suitable decision regarding whether or not a collision between the subject vehicle and the obstacle will occur.

As previously described, the warning area (WA1) is set on the basis of an estimated relative travel region of the subject vehicle with respect to the obstacle. The given warning process is executed only in cases where the obstacle remains in the warning area (WA1) for the given time. Thereby, it is possible to generate a reliable alarm.

To detect whether or not the subject vehicle travels along a curved path, it is unnecessary to provide a steering sensor or a yaw rate sensor. Accordingly, a simple and low-cost structure is enabled.

In the obstacle warning system according to the second aspect of this invention, the radius (Re) of the estimated relative curved path of the vehicle is calculated on the basis of two correction-resultant relative positions which are derived from relative positions (X, Y) of at least three points of the obstacle by, for example, a least square method. In this case, a calculation error is small so that the calculated radius (Re) is relatively accurate.

The curvature radius (Re) can be calculated from two relative positions of the obstacle. In some cases, reflecting conditions of an obstacle vary. For example, there is a change between the case where both left-hand and right-hand reflectors of a preceding vehicle are visible and the case where only one of the reflectors is visible. A variation in the reflecting conditions of the obstacle tends to cause an error in the calculated relative positions of the obstacle. Such an error is compensated by correcting three or more calculated relative positions according to a least square method, and the calculated radius (Re) can be more accurate and the set warning area (WA1) can be more appropriate.

According to the obstacle warning system at the third aspect of this invention a straight travel condition is regarded as being present under certain circumstances. This feature enables the prevention of a failure to generate a necessary alarm.

In the obstacle warning system according to the third aspect of this invention, a straight traveling condition is regarded as being present in cases where an amount of movement of the obstacle relative to the vehicle in the direction of the width of the vehicle is equal to or smaller than a given value, and where the obstacle is in a given area in direct front of the vehicle on the basis of relative positions (X, Y) of at least two points of the obstacle which are calculated by the relative position calculating means. In cases where a straight traveling condition is regarded as being present, the radius (Re) is regarded as being infinite without executing a normal radius calculating process while the given warning area (WA1) is set on the basis of the infinite radius (Re) and the width of the vehicle.

As previously described, the distance measuring system is operative for emitting transmission wave or laser light into a given angular range in a direction of a width of the vehicle in a scanning manner, and for detecting a distance (L) between the vehicle and an obstacle in correspondence with a scan angle ($\theta$) on the basis of reflected wave or reflected light from the obstacle. An error is caused in connection with the related scanning resolution in the direction of the width of the vehicle.

In FIG. 40, four broken lines denote the boundaries among paths of a laser light beam, and central solid lines among the broken lines correspond to positions which occur after quantization of the beams. A stationary object is now assumed which approaches the subject vehicle along a linear path meeting the subject vehicle, and which moves across a boundary between neighboring paths of the laser light beam during a period between successive quantization moments. With reference to FIG. 40, such a stationary object tends to be regarded as approaching the subject vehicle along a curved path which will not meet the subject vehicle. This problem is solved as follows.

As shown in FIG. 41, in cases where an amount of movement of the obstacle relative to the vehicle in the direction of the width of the vehicle is equal to or smaller than a given value, and where the obstacle is in a given area in direct front of the vehicle, a straight traveling condition is regarded as being present without calculating the curvature radius. Thereby, it is possible to prevent a failure to generate a necessary alarm. With reference to FIG. 41, a judgment regarding whether or not the obstacle is in the given area in direct front of the vehicle is executed by determining whether or not the obstacle is in a given area corresponding to a given number (for example, three) of front steps in the scanning by the laser light or the wave.

The obstacle warning system according to the fourth aspect of this invention is designed to compensate for an error caused by the range scanned by the distance measuring means, and to prevent the generation of a wrong alarm.

In the obstacle warning system according to the fourth aspect of this invention, when at least a part of the obstacle moves from the given angular range which can be scanned by the distance measuring means to a region outside the given angular range, the relative position (X, Y) of the obstacle is calculated in the relative position calculating means as a position corresponding to an edge of the obstacle closer to the vehicle before at least the part of the obstacle relatively moves to the region outside the given angular range.

In the case where the obstacle agrees with a preceding vehicle, the detection of the obstacle mainly uses reflected light or reflected wave from reflectors provided on the rear of the preceding vehicle. When the subject vehicle passes a stationary vehicle or a low-speed vehicle so that the forward vehicle moves out of a scan range SR with respect to the subject vehicle, there occurs a change from conditions where both left-hand and right-hand reflectors of the forward vehicle are visible to conditions where only one of the reflectors is visible. In this case, as shown in FIG. 42, the forward vehicle tends to be regarded as approaching the subject vehicle along a curved path meeting the subject vehicle although, in fact, the center of the forward vehicle relatively moves along a curved or straight path sufficiently separate from and parallel with the course of the subject vehicle. In some cases, such an erroneous judgment results in the generation of a wrong alarm. This problem is solved as follows.

During movement of the forward vehicle out of the scan range SR, an inner reflector (as viewed from the center of the subject vehicle) of the forward vehicle which is closer to the subject vehicle remains visible until the whole of the forward vehicle exits from the scan range SR. Accordingly, as shown in FIG. 43, the relative position of an edge of the forward object which is closer to the subject vehicle is used in the estimation of the curvature radius. This design enables the prevention of generation of a wrong alarm.

The obstacle warning system according to the fifth aspect of this invention is designed to compensate for an error caused by dust on a reflector of a preceding vehicle. Specifically, in the obstacle warning system according to the fifth aspect of this invention, when a width of the obstacle which is recognized on the basis of the relative position thereof corresponds to a given vehicle width and corresponds to a width of a vehicle reflector, a method of calculation of the radius of the estimated curved path is changed in response to a rate of data corresponding to the width of the vehicle reflector with respect to all data.

In the case where one of left-hand and right-hand reflectors of the forward vehicle is made invisible by dust, there is a chance of a wrong alarm due to an erroneous estimation of the curvature radius. Such a problem is solved as follows. When a rate of data corresponding to the width of the vehicle reflector with respect to all data is small, the data corresponding to the width of the vehicle reflector is excluded from the estimation of the curvature radius.

When a rate of data corresponding to the width of the vehicle reflector with respect to all data is great, the curvature radius is estimated from the edge of the forward object.

In the obstacle warning system according to the sixth aspect of this invention, the vehicle speed detecting system is operative for detecting a speed (V) of the vehicle, and the relative speed calculating unit is operative for calculating a relative speed (Vr) of the obstacle with respect to the vehicle on the basis of the relative position calculated by the relative position calculating unit. The motion judgment unit is operative for judging whether the obstacle is moving or stationary on the basis of the relative speed (Vr) of the obstacle and the speed (V) of the vehicle. The second warning system is operative for executing a given warning process in cases where the obstacle is found to be moving by the motion judgment means and the obstacle remains in a given auxiliary warning area (WA2) set with respect to the vehicle for a given time even when the given warning process based on the warning area (WA1) is not executed by the warning process means.

As previously described, a given warning process is executed in cases where the obstacle is found to be moving and the obstacle remains in a given auxiliary warning area (WA2) set with respect to the vehicle for a given time even when the given warning process based on the warning area (WA1) is not executed. Thus, complicated calculations are unnecessary, and it is sufficient to execute a determination as to whether the obstacle remains in the given auxiliary warning area (WA2) set with respect to the vehicle for the given time. This design enables prompt execution of the warning process and an increase in the possibility avoidance of a collision.

In the obstacle warning system according to the seventh aspect of this invention, the given auxiliary warning area is variably set with respect to the vehicle based on a standard vehicle speed assumed in consideration of a road shape. The road shape relates to, for example, a lane width and a road curvature radius. Usually, an express highway has a greater lane width and a greater curvature radius than those of a general road. The given auxiliary warning area is changed depending on whether a road currently traveled by the subject vehicle agrees with an express highway or a general road. Furthermore, the given auxiliary warning area may be changed in accordance with conditions of a general road. The standard vehicle speed assumed in consideration of a road shape is made high for an express highway and is made low for a general road. This design enables the setting of a more appropriate auxiliary warning area while a wrong alarm is prevented from occurring with respect to a forward vehicle traveling along a lane separate from subject vehicle's lane.

As previously described, the auxiliary warning area is changed in response to the standard vehicle speed assumed in consideration of a road shape. In the case where data representing numeral values for setting an auxiliary warning area with respect to each standard vehicle speed is previously stored in a memory such as a ROM, the setting of the auxiliary warning area can be easily executed by reading out the data from the memory.

In the obstacle warning system according to the eighth aspect of this invention, the distance measuring system is operative for emitting transmission wave or laser light into a given angular range in a direction of a width of the vehicle in a scanning manner, and for detecting a distance (L) between the vehicle and an obstacle in correspondence with a scan angle ($\theta$) on the basis of reflected wave or reflected light from the obstacle. The relative position calculating unit is operative for calculating a relative position (Xp, Yp) of the obstacle with respect to the vehicle on the basis of the distance (L) detected by the distance measuring unit and a corresponding scan angle ($\theta$) as an X-Y coordinate data in which a position of the vehicle is defined as an origin, and a direction of the width of the vehicle is defined as an X axis and a longitudinal direction of the vehicle is defined as a Y axis. The warning area setting unit is operative for setting a warning area (WA) having a triangular shape defined by straight lines connecting a point (Xp, Yp) of the relative position of the obstacle which is calculated by the relative position calculating unit, the origin (0, 0), and a given point (0, Yq) on the Y axis. The warning process means is operative for executing a given warning process in cases where the obstacle remains in the warning area for a given time after the warning area (WA) is set.

An example of conditions of the execution of the given warning process is as follows. In the case where the relative position of a preceding vehicle is iteratively sampled at a given period, the warning area (WA) is set in response to the first relative position as shown in FIG. 27. When three or more of the second, third, fourth, and fifth relative positions are in the warning area (WA), the given warning process is executed.

The distance measuring system is able to detect a distance (L) between the vehicle and an obstacle in correspondence with a scan angle ($\theta$) in the given angular range in the direction of the width of the vehicle. The scanning enables detection of an obstacle in a wide range, prevention of missing an obstacle during travel along a curved path, and detection of transverse movement of the obstacle. Accordingly, the scanning can decrease the possibility of generation of a wrong alarm and enhance the warning ability in conjunction with the warning process described later.

A suitable alarm can be generated even in the case of travel along a curved path for the following reasons. The set warning area (WA) has a triangular shape defined by straight lines connecting a point (Xp, Yp) of the relative position of the obstacle, the origin (0, 0), and a given point (0, Yq) on the Y axis. The given warning process is executed in cases where the obstacle remains in the warning area for the given time.

As previously described, the warning area (WA) is set on the basis of an estimated relative travel region of the subject vehicle with respect to the obstacle. The given warning process is executed only in cases where the obstacle remains in the warning area (WA) for the given time. Thereby, it is possible to generate a reliable alarm.

In the case where the subject vehicle passes a preceding vehicle which continues to travel along a lane neighboring subject vehicle's lane as shown by the behavior "c" of FIG. 38, the relative position of the preceding vehicle is not in the warning area (WA) after the setting of the warning area (WA) as understood from FIG. 27. Therefore, in this case, the warning process is not executed. In the case where a preceding vehicle cuts in with respect to the subject vehicle at a position sufficiently distant from the subject vehicle as shown by the behavior "f" of FIG. 38, the relative position of the preceding vehicle is not in the warning area (WA) immediately after the setting of the warning area (WA). Accordingly, during a former stage of this case, the warning process is not executed. In the case where a preceding vehicle cuts in with respect to the subject vehicle at a position insufficiently distant from the subject vehicle as shown by the behavior "d" or "e" of FIG. 38, the relative position of the preceding vehicle remains in the warning area (WA) immediately after the setting of the warning area (WA). Accordingly, in this case, the warning process is executed.

To detect whether or not the subject vehicle travels along a curved path, it is unnecessary to provide a steering sensor or a yaw rate sensor. Therefore, a simple and low-cost structure is enabled.

In the obstacle warning system according to the ninth aspect of this invention, the given point (0, Yq) on the Y axis for the setting of the warning area (WA) by the warning area setting means is variably set on the basis of Y coordinate data of the relative position (Xp, Yp) of the obstacle. For example, the value Yq of the given point (0, Yq) is set to about a half of the value Yp of the relative position (Xp, Yp) of the obstacle. It is preferable that the value Yq with respect to the value Yp is provided as map data. In the case where the value Yp corresponds to about 30 m or less, the value Yq may be set equal to the value Yp.

Usually, an express highway has a greater lane width and a greater curvature radius than those of a general road. The warning area (WA) may be changed depending on whether a road currently traveled by the subject vehicle agrees with an express highway or a general road. Furthermore, the warning area (WA) may be changed in accordance with conditions of a general road.

The obstacle warning system according to the tenth aspect of this invention features the following process. In cases where an absolute value of an X coordinate of the relative position (Xp, Yp) of the obstacle is equal to or greater than a given value (Xm) during the setting of the warning area (WA) by the warning area setting unit, a part of the warning area (WA) which is in a region equal to or greater than the given value (Xm) is deleted. The deletion of the part from the warning area (WA) is to prevent the generation of a wrong alarm.

As shown in FIG. 44, an outer triangle is provided within the warning area (WA). The outer triangle is defined by straight lines connecting the origin (0, 0) representative of the position of the subject vehicle, the relative position (Xp, Yp) of the forward object, and a point (0, 0.4Yq) on the Y axis. A part of the outer triangle which has an X coordinate absolute value equal to the given value (Xm) or more is deleted from the warning area (WA).

The obstacle warning system according to the eleventh aspect of this invention features the following process. In cases where an absolute value of an X coordinate of the relative position (Xp, Yp) of the obstacle is equal to or smaller than a given value (Xn) during the setting of the warning area (WA) by the warning area setting means, a new warning area (WAa) in a region equal to or smaller than the given value (Xn) is added to the warning area (WA). The addition of the new warning area (WAa) is to enable the generation of a reliable alarm.

The obstacle warning system according to the twelfth aspect of this invention features the method of expanding the warning area (WA). Specifically, as shown in FIG. 45, in cases where an absolute value of an X coordinate of the relative position (Xp, Yp) of the obstacle is equal to or smaller than the given value (Xn), a warning area (WAn) having a triangular shape is set which is defined by straight lines connecting the point (Xp, Yp) of the relative position of the obstacle and two points {(Xn, 0), (−Xn, 0)} on the X axis which have absolute values equal to the given value (Xn), and thereby the addition of the new warning area (WAa) is executed.

BRIEF DESCRIPTION OF THE DRAWINGS

FIG. 5 is a flowchart of the details of a block in FIG. 4.

FIG. 6 is a flowchart of the details of a block in FIG. 5.

DESCRIPTION OF THE PREFERRED EMBODIMENTS

First Embodiment

Figure 1:
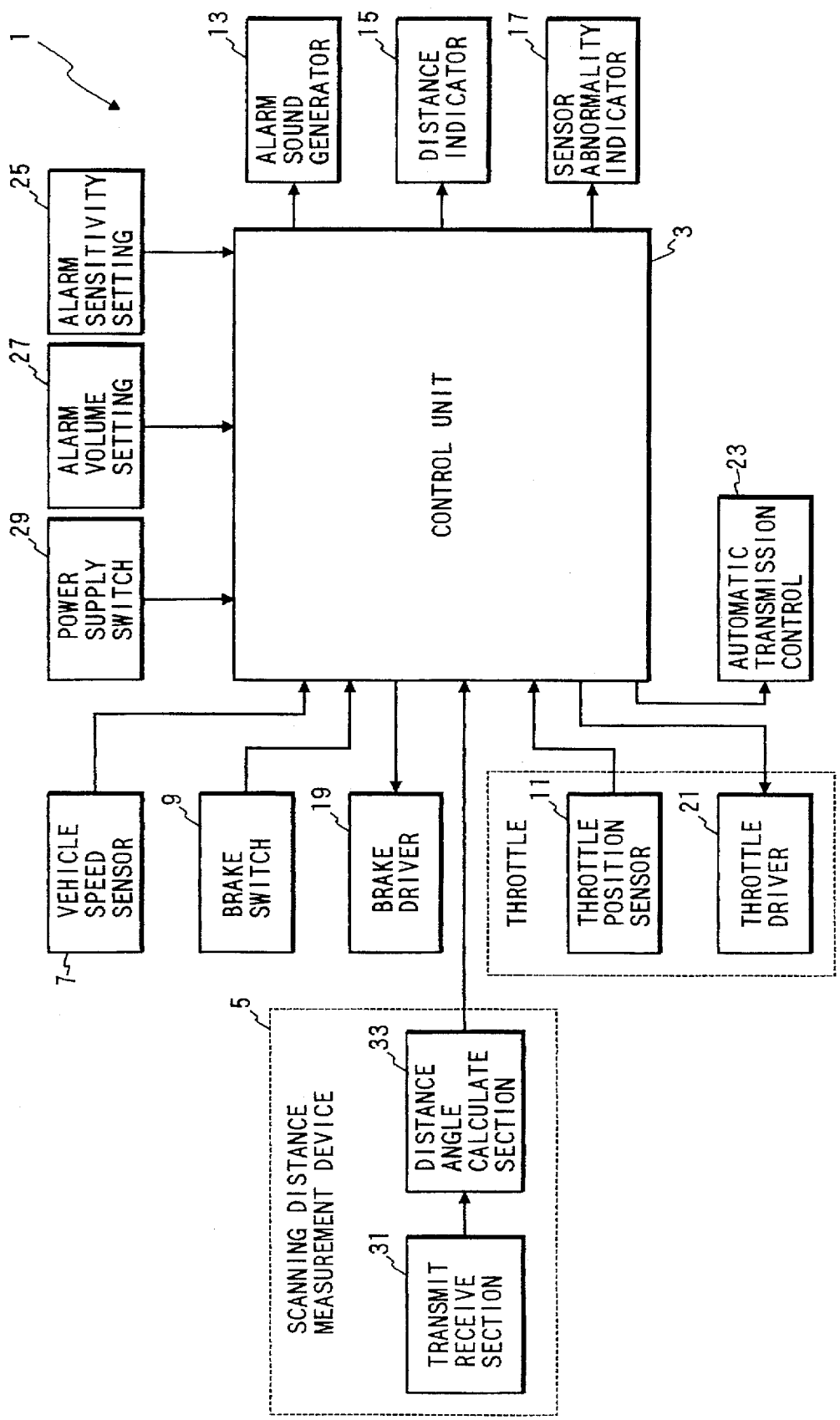
FIG. 1 is a block diagram of an obstacle warning system according to a first embodiment of this invention.

With reference to FIG. 1, an obstacle warning system 1 is generally mounted on an automotive vehicle. The obstacle warning system 1 detects an obstacle ahead of the subject vehicle. In the case where the obstacle remains in a warning range under given conditions, the obstacle warning system 1 generates an alarm to warn subject vehicle's driver.

As shown in FIG. 1, the obstacle warning system 1 includes a control unit 3 containing a microcomputer having a combination of an input/output port (an I/O interface), a RAM, a ROM, and a CPU.

The control unit 3 operates in accordance with a program stored in the ROM.

The control unit 3 is electrically connected to a scanning distance measurement device 5, a vehicle speed sensor 7, a brake switch 9, and a throttle position sensor 11. The control unit 3 receives the output signals from these devices 5, 7, 9, and 11.

The control unit 3 is electrically connected to an alarm sound generator 13, a distance indicator 15, a sensor abnormality indicator 17, a brake driver 19, a throttle driver 21, and an automatic transmission control device 23. The control unit 3 outputs drive signals to these devices 13, 15, 17, 19, 21, and 23 respectively.

The control unit 3 is electrically connected to an alarm sensitivity setting device 25 and an alarm volume setting device 27.

The control unit 3 receives the output signals from these devices 25 and 27. The control unit 3 is electrically connected to a power supply switch 29. When the power supply switch 29 changes from an off position to an on position, the control unit 3 starts to operate.

The scanning distance measurement device 5 includes a transmitting and receiving section 31 and a distance and angle calculator 33. The transmitting and receiving section 31 emits a laser light beam forward of the subject vehicle. A given angular range ahead of the subject vehicle is scanned by the laser light beam as the laser light beam is angularly moved by step by step. Every step in the angular movement of the laser light beam corresponds to a given small angle. In other words, during the scanning process, an angle of the path of the laser light beam relative to the subject vehicle, which is referred to as a scan angle, changed step by step. The transmitting and receiving section 31 receives a reflected or echo light beam. The distance and angle calculator 33 detects the interval of time between the moment of transmission of the laser light beam and the moment of reception of the corresponding reflected light beam in response to an output signal of the transmitting and receiving section 31. The distance and angle calculator 33 calculates the distance to a forward object causing the reflected light beam, that is, the distance between the subject vehicle and an object ahead of the subject vehicle, in response to the detected time interval. The distance and angle calculator 33 informs the control unit 3 of the calculated distance between the subject vehicle and the forward object. In addition, the distance and angle calculator 33 calculates the angle of the forward object relative to the subject vehicle in response to the direction of the received reflected light beam or the transmitted light beam which is represented by a scan-angle-related output signal of the transmitting and receiving section 31. The distance and angle calculator 33 informs the control unit 3 of the calculated angle of the forward object relative to the subject vehicle. The angle of the forward object relative to the subject vehicle is referred to as the scan angle.

It should be noted that the scanning distance measurement device 5 may be of another type using, for example, ultrasonic wave or radio wave, such as microwave.

The control unit 3 serves to generate an alarm in certain cases, such as a case where an obstacle (a forward object) remains in a given warning area for a prescribed time or longer. Examples of the obstacle include, for example, a moving vehicle which precedes the subject vehicle, a stationary vehicle in front of the subject vehicle, an object at a side of a road, a guardrail, and a pole.

The brake driver 19, the throttle driver 21, and the automatic transmission control device 23 are used in executing vehicle cruise control related to the speed of the subject vehicle. It should be noted that the brake driver 19, the throttle driver 21, and the automatic transmission control device 23 may be omitted from the obstacle warning system 1.

Figure 2:
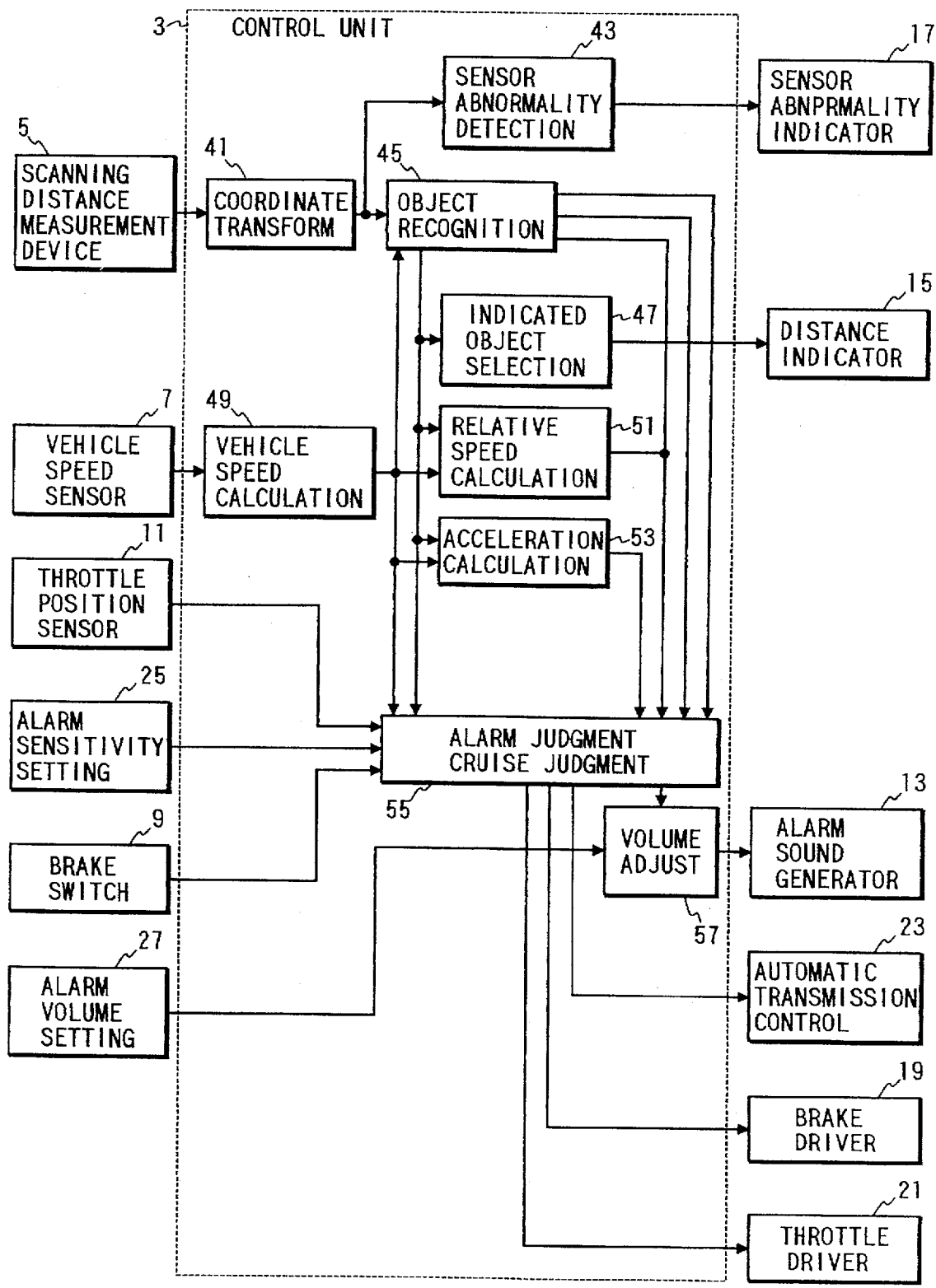
FIG. 2 is a diagram of the obstacle warning system in FIG. 1.

FIG. 2 shows the flow of operation of the control unit 3. It should be noted that FIG. 2 does not directly show the details of the hardware of the control unit 3. Operation of the control unit 3 will be described hereinafter with reference to FIG. 2. Signals output from the scanning distance measurement device 5, which represent the calculated distance L and the calculated scan angle θ, are processed by a coordinate transformation block 41. Specifically, the distance L and the scan angle θ are transformed into values in XY orthogonal coordinates (two-dimensional orthogonal coordinates), the origin (0, 0) of which agrees with a point (for example, the center of the front) of the subject vehicle.

A sensor abnormality detection block 43 following the coordinate transformation block 41, receives information of the values in the XY orthogonal coordinates from the coordinate transformation block 41, and decides whether or not the values in the XY orthogonal coordinates are in a given abnormal range. When the values in the XY orthogonal coordinates are in the given abnormal range, the sensor abnormality detection block 43 activates the sensor abnormality indicator 17 to indicate that the scanning distance measurement device 5 is wrong. Otherwise, the sensor abnormality detection block 43 deactivates the sensor abnormality indicator 17.

An object recognition block 45, following the coordinate transformation block 41, receives information of the values in the XY orthogonal coordinates from the coordinate transformation block 41, and recognizes and decides the type of the forward object, the width W of the forward object, and the coordinates (X, Y) of the position of the center of the forward object in response to the values in the XY orthogonal coordinates. The decided type of the forward object is changeable between two types corresponding to a stationary object, and a moving object respectively.

A distance indicated object selection block 47, following the object recognition block 45, receives information of the position of the center of the forward object from the object recognition block 45. The distance indicated object selection block 47 decides whether or not the forward object has a given or higher chance of interference with the travel of the subject vehicle in response to the position of the center of the forward object. When the forward object has the given or higher chance of interference with the travel of the subject vehicle, the distance indicated object selection block 47 retrieves or derives the distance between the subject vehicle and the forward object from the position of the center of the forward object. In addition, in this case, the distance indicated object selection block 47 controls the distance indicator 15 so that the distance between the subject vehicle and the forward object will be indicated on the distance indicator 15. When the forward object does not have the given or higher chance of interference with the travel of the subject vehicle, the distance indicated object selection block 47 deactivates the distance indicator 15.

The output signal of the vehicle speed sensor 7 is processed by a vehicle speed calculation block 49. The vehicle speed calculation block 49 derives or calculates the speed of the subject vehicle from the output signal of the vehicle speed sensor 7.

A relative speed calculation block 51, following the vehicle speed calculation block 49, receives information of the speed of the subject vehicle from the vehicle speed calculation block 49. The relative speed calculation block 51 also follows the object recognition block 45, and receives the information of the position of the center of the forward object from the object recognition block 45. The relative speed calculation block 51 calculates the speed Vr of the forward object relative to the position of the subject vehicle in response to the speed of the subject vehicle and the position of the center of the forward object.

A forward object acceleration calculation block 53, following the vehicle speed calculation block 49, receives the information of the speed of the subject vehicle from the vehicle speed calculation block 49. The forward object acceleration calculation block 53 also follows the object recognition block 45, and receives the information of the position of the center of the forward object from the object recognition block 45. The forward object acceleration calculation block 53 calculates the acceleration of the forward object relative to the position of the subject vehicle in response to the speed of the subject vehicle and the position of the center of the forward object.

An alarm decision and cruise decision block 55 follows the object recognition block 45, the vehicle speed calculation block 49, the relative speed calculation block 51, and the forward object acceleration calculation block 53. The alarm decision and cruise decision block 55 receives the information of the position of the center of the forward object, the information of the width of the forward object, and the information of the type of the forward object from the object recognition block 45. The alarm decision and cruise decision block 55 receives the information of the speed of the subject vehicle from the vehicle speed calculation block 49.

The alarm decision and cruise decision block 55 receives the information of the relative speed Vr of the forward object from the relative speed calculation block 51. The alarm decision and cruise decision block 55 receives the information of the acceleration of the forward object from the forward object acceleration calculation block 53. The alarm decision and cruise decision block 55 is informed of the output signals of the brake switch 9, the throttle position sensor 11, and the alarm sensitivity setting device 25.

The alarm decision and cruise decision block 55 determines whether or not an alarm should be generated by referring to the information pieces fed from the blocks 45, 49, 51, and 53 and the devices 9, 11, and 25. In the case where an alarm should be generated, the alarm decision and cruise decision block 55 outputs an alarm generation signal to the alarm sound generator 13 via a volume control block 57 so that the alarm sound generator 13 will produce an alarm sound. The volume control block 57 is informed of the output signal of the alarm volume setting device 27 which represents a setting value or a desired value of the volume of an alarm sound. The volume control block 57 adjusts the alarm generation signal in response to the output signal of the alarm volume setting device 27 so that the alarm sound produced by the alarm sound generator 13 will be controlled at the setting value represented by the output signal of the alarm volume setting device 27. On the other hand, in the case where an alarm should not be generated, the alarm decision and cruise decision block 55 deactivates the alarm sound generator 13.

The alarm decision and cruise decision block 55 determines whether or not cruise control should be executed by referring to the information pieces fed from the blocks 45, 49, 51, and 53 and the devices 9, 11, and 25. In the case where cruise control should be executed, the alarm decision and cruise decision block 55 determines controls the speed of the subject vehicle and generates active control signals for this purpose. The generated active control signals are fed to the brake driver 19, the throttle driver 21, and the automatic transmission control device 23 so that the cruise control will be executed. On the other hand, in the case where cruise control should not be executed, the alarm decision and cruise decision bock 55 does not output the active control signals to the devices 19, 21, and 23.

Figure 3:
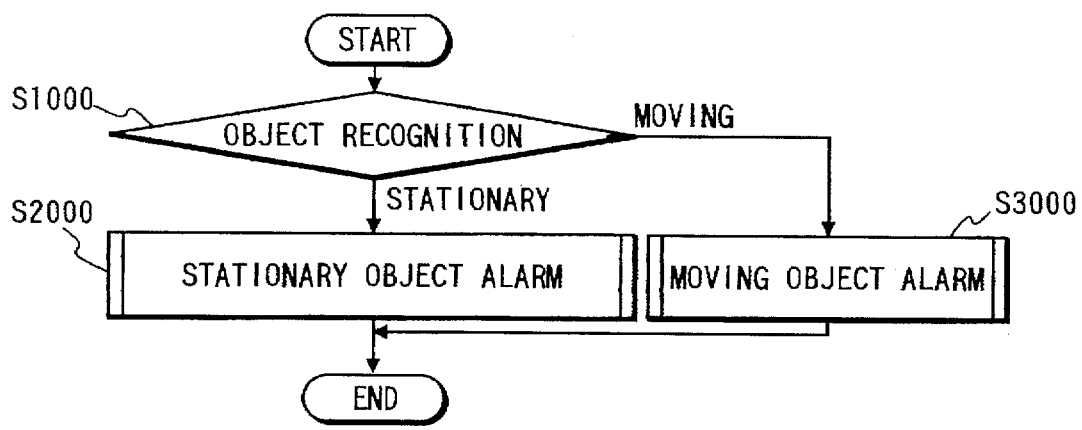
FIG. 3 is a flowchart of a segment of a program for operating a control unit in FIGS. 1 and 2.

As previously described, the control unit 3 operates in accordance with a program stored in its internal ROM. When the power supply switch 29 changes from the off position to the on position, the control unit 3 starts to operate. FIG. 3 is a flowchart of an alarm-related segment of the program which is periodically reiterated while the power supply switch 29 remains in the on position.

As shown in FIG. 3, a first block S1000 of the alarm-related segment of the program decides the type of a detected forward object, that is, determines whether a detected forward object agrees with a stationary object or a moving object. The block S1000 in FIG. 3 corresponds to the object recognition block 45 in FIG. 2.

Specifically, the block S1000 derives the speed of the subject vehicle from the output signal of the vehicle speed sensor 7. The block S1000 calculates the speed of the forward object relative to the subject vehicle in response to the speed of the subject vehicle and the output signals of the scanning distance measurement device 5. The block S1000 decides whether or not the forward object is stationary or moving by referring to the speed of the subject vehicle and the relative speed of the forward object. When the forward object is found to be stationary, the program advances from the block S1000 to a block S2000. On the other hand, when the forward object is found to be moving, the program advances from the block S1000 to a block S3000.

The blocks S2000 and S3000 execute a stationary object warning process and a moving object warning process respectively. The blocks S2000 and S3000 correspond to the alarm decision and cruise decision block 55 in FIG. 2. After the blocks S2000 and S3000, the current execution cycle of the alarm-related segment of the program ends.

Figure 4:
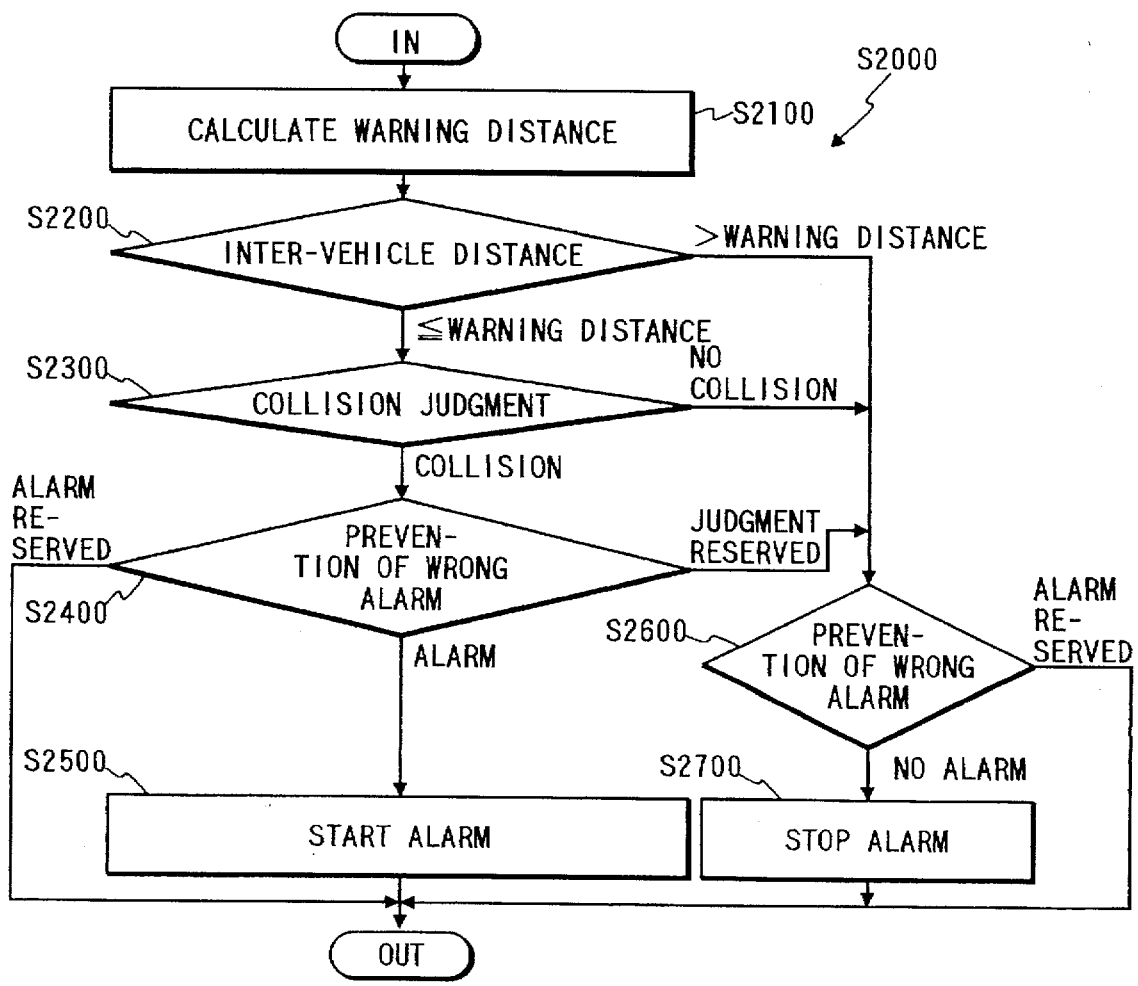
FIG. 4 is a flowchart of the details of a block in FIG. 3.

FIG. 4 shows the details of the stationary object warning block S2000 in FIG. 3. As shown in FIG. 4, a first step S2100 of the stationary object warning bock S2000, which follows the block S1000 (see FIG. 3), determines a stationary object warning distance. Specifically, the step S2100 receives the information of the speed of the subject vehicle which is derived from the output signal of the vehicle speed sensor 7. The step S2100 determines the stationary object warning distance in response to the speed of the subject vehicle. The determined stationary object warning distance varies as a function of the speed of the subject vehicle.

For example, in the case where the speed of the subject vehicle is equal to or lower than 60 Km/h, the stationary object warning distance is set to an estimated distance which will be traveled by the subject vehicle until its stop under the application of the brake to the subject vehicle at a normal degree. In the case where the speed of the subject vehicle exceeds 60 Km/h, the stationary object warning distance is set to an estimated distance which will be traveled by the subject vehicle until its stop under the application of the brake to the subject vehicle at a relatively high degree.

It is preferable to determine the stationary object warning distance in consideration of both a time lag in the subject vehicle driver's response (a response time of the subject vehicle's driver) regarding the action of the application of the brake and the degree of the application of the brake by the subject vehicle's driver. It should be noted that an actual distance which will be traveled by the subject vehicle until its stop under the application of the brake depends on the time lag in the subject vehicle driver's response and the degree of the application of the brake.

Generally, such a distance traveled by the subject vehicle varies from driver to driver. In other words, there is an individual driver difference in the distance traveled by the subject vehicle based on the driver's response time. The individual driver difference can be compensated as follows. The step S2100 derives information of a setting sensitivity or a desired sensitivity from the output signal of the alarm sensitivity setting device 25 (see FIGS. 1 and 2). The subject vehicle's driver can adjust the setting sensitivity (the desired sensitivity) by actuating the alarm sensitivity setting device 25. The step S2100 adjusts the stationary object warning distance in response to the setting sensitivity (the desired sensitivity). It is preferable that the stationary object warning distance increases as the setting sensitivity (the desired sensitivity) rises.

A step S2200, following the step S2100, derives the distance between the subject vehicle and the forward object from the output signals of the scanning distance measurement device 5. The step S2200 compares the derived distance between the subject vehicle and the forward object with the stationary object warning distance determined by the step S2100. When the distance between the subject vehicle and the forward object is equal to or shorter than the stationary object warning distance, the program advances from the step S2200 to a block S2300 for executing a judgment on collision. Otherwise, the program advances from the step S2200 to a block S2600 for preventing a wrong alarm.

The block S2300 decides whether or not the subject vehicle will collide with the forward object, that is, whether or not a possible collision is present. In the presence of a possible collision, the program advances from the block S2300 to a block S2400 for preventing a wrong alarm. In the absence of a possible collision, the program advances from the block S2300 to the block S2600.

The block S2400 determines whether or not judgment on the generation of an alarm should be reserved. When judgment on the generation of an alarm should be reserved, the program advances from the block S2400 to the block S2600. In addition, the block S2400 determines whether an alarm should be generated or reserved. When an alarm should be generated, the program advances from the block S2400 to a step S2500. On the other hand, when an alarm should be reserved, the program advances from the block S2400 and exits from the stationary object warning bock S2000.

The step S2500 activates the alarm sound generator 13 so that the alarm sound generator 13 will produce an alarm sound. After the step S2500, the program exits from the stationary object warning bock S2000.

The block S2600 determines whether or not an alarm should be reserved. When an alarm should be reserved, the program advances from the block S2600 and exits from the stationary object warning bock S2000. In addition, the block S2600 determines whether or not an alarm should be stopped. When an alarm should be stopped, the program advances from the block S2600 to a step S2700.

The step S2700 deactivates the alarm sound generator 13 so that the alarm sound generator 13 will stop an alarm sound. After the step S2700, the program exits from the stationary object warning bock S2000.

FIG. 5 shows the details of the collision judgment block S2300 in FIG. 4. As shown in FIG. 5, a first block S2310 of the collision judgment block S2300 which follows the block S2200 (see FIG. 4) estimates the radius of the curvature of the path or the trajectory of the subject vehicle relative to the forward object.

A step S2330 following the block S2310 sets a warning area in response to the curvature radius estimated by the block S2310. A block S2350 following the step S2330 determines whether a possible collision is present or absent. In the presence of a possible collision, the program advances from the block S2350 to the block S2400 (see FIG. 4). In the absence of a possible collision, the program advances from the block S2350 to the block S2600 (see FIG. 4).

FIG. 6 shows the details of the curvature radius estimating block S2310 in FIG. 5. As shown in FIG. 6, a first step S2311 of the curvature radius estimating block S2310 calculates the position of the forward object in a direction parallel to the transverse direction (the orthogonal coordinate X-axis direction) of the subject vehicle in response to the output signals of the scanning distance measurement device 5 (see FIGS. 1 and 2). In response to the latest calculated position and a previously calculated position of the forward object, the step S2311 calculates the amount of movement of the forward object in the direction parallel to the transverse direction of the subject vehicle which occurs during a given short period. The step S2311 determines whether or not the starting point of the movement of the forward object is in a given angular range centered at the just frontward direction of the subject vehicle. The given angular range has a dimension corresponding to, for example, three steps in the scanning by the laser light beam. It should be noted that a region ahead of the subject vehicle is scanned by the laser light beam as the laser light beam is angularly shifted step by step corresponding to a given small angle. In addition, the step S2311 determines whether or not the amount of the movement of the forward object between the starting point and the ending point is within a given amount corresponding to one step in the scanning by the laser light beam. When the starting point of the movement of the forward object is in the given angular range and the amount of the movement of the forward object is within the given amount, the program advances from the step S2311 to a step S2321. Otherwise, the program advances from the step S2311 to a step S2313.

The step S2321 regards the curvature radius as being indefinite. In other words, the step S2321 regards the subject vehicle as traveling straight relative to the forward object. Specifically, the step S2321 sets the curvature radius to approximately an infinite value. After the step S2321, the program exits from the curvature radius estimating block S2310.

The steps S2311 and S2321 cooperate to regard the subject vehicle as traveling straight relative to the forward object in the case where the obstacle is in a given range ahead of the subject vehicle and the obstacle is moving at a small rate in a direction parallel to the transverse direction of the subject vehicle. The operation of the steps S2311 and S2321 is designed to compensate for an error related to the resolution of the positional detection by the scanning distance measurement device 5 in the transverse direction.

The step S2313 determines whether or not the position of the forward object is in a given narrow range extending along the forward direction of the subject vehicle which starts from the center of the subject vehicle, that is, whether or not the position of the forward object is in a given narrow range directly ahead of the center of the subject vehicle. Specifically, the step S2313 determines whether or not the position of the forward object in the transverse direction of the subject vehicle is near the center of the subject vehicle. When the position of the forward object in the transverse direction of the subject vehicle is near the center of the subject vehicle, the program advances from the step S2313 to a step S2315. When the position of the forward object in the transverse direction of the subject vehicle is separate from the center of the subject vehicle by a distance of, for example, 2 m or more, the program advances from the step S2313 to a step S2319.

Figure 12:
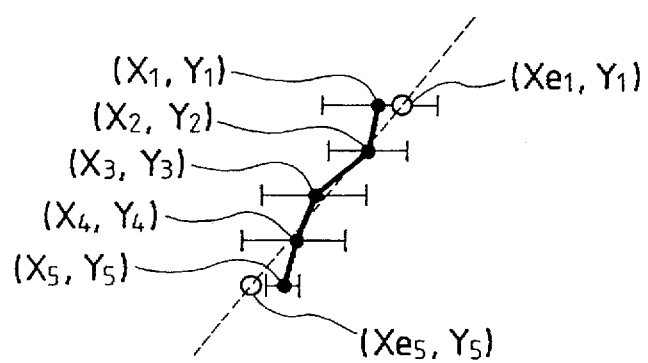
FIG. 12 is a diagram of measured positions and correction-resultant positions of an obstacle.

The step S2315 corrects the starting point and the ending point of movement of the forward object. Specifically, the step S2315 refers to the latest and four previous positions of the forward object which have been measured during five successive cycles of the scanning. As shown in FIG. 12, the coordinates of the latest and four previous central positions of the forward object are denoted by (X5, Y5), (X4, Y4), (X3, Y3), (X2, Y2), and (X1, Y1), respectively. By using a least square method, the step S2315 calculates the straight line along which the five points (X5, Y5), (X4, Y4), (X3, Y3), (X2, Y2), and (X1, Y1) are distributed. The step S2315 corrects the original starting point (X1, Y1) into a correction-resultant starting point (Xe1, Y1) on the straight line. The correction-resultant starting point (Xe1, Y1) results from transversely shifting the original starting point (X1, Y1) onto the straight line. The step S2315 corrects the original ending point (X5, Y5) into a correction-resultant ending point (Xe5, Y5) on the straight line. The correction-resultant ending point (Xe5, Y5) results from transversely shifting the original ending point (X5, Y5) onto the straight line. In more detail, the step S2315 calculates the transverse locations Xe1 and Xe5 of the correction-resultant starting point (Xe1, Y1) and the correction-resultant ending point (Xe5, Y5) by referring to the following equations.

$$Xe1 = a + bY1, \; Xe5 = a + bY5$$

where:

$$b = \frac{\Sigma YiXi - \{(\Sigma Yi)(\Sigma Xi)/n\}}{\Sigma Yi^2 - \{(\Sigma Yi)^2/n\}}, \; a = \frac{\Sigma Xi}{n} - b\frac{\Sigma Yi}{n}$$

The correction of the starting point and the ending point of movement of the forward object by the step S2315 is to compensate for an error caused by time-domain variations in light-reflecting conditions of the forward vehicle.

With reference back to FIG. 6, the step S2319 corrects the starting point and the ending point of movement of the forward object. Specifically, the step S2319 refers to the latest and four previous positions of the inner edge (as viewed from the center of the subject vehicle) of the forward object which have been measured during five successive cycles of the scanning. By using a least square method, the step S2319 calculates the straight line along which the five points are distributed. The step S2319 calculates a correction-resultant starting point on the straight line which results from transversely shifting the most previous position of the inner edge of the forward object onto the straight line. The step S2319 calculates a correction-resultant ending point on the straight line which results from transversely shifting the latest position of the inner edge of the forward object onto the straight line.

As the subject vehicle passes another vehicle, one of reflectors of the other vehicle (the object vehicle) disappears from the scan range ahead of the subject vehicle. The disappearance of one of the reflectors tends to cause an error in the detection of the position of the object vehicle. The correction of the starting point and the ending point of movement of the forward object by the step S2319 is to compensate for such an error.

A step S2317 following the steps S2315 and S2319 calculates the radius of the curvature of the path or the trajectory of the subject vehicle relative to the forward object from the correction-resultant starting point (Xe1, Y1) and the correction-resultant ending point (Xe5, Y5) given by the step S2315 or S2319.

Figure 13:
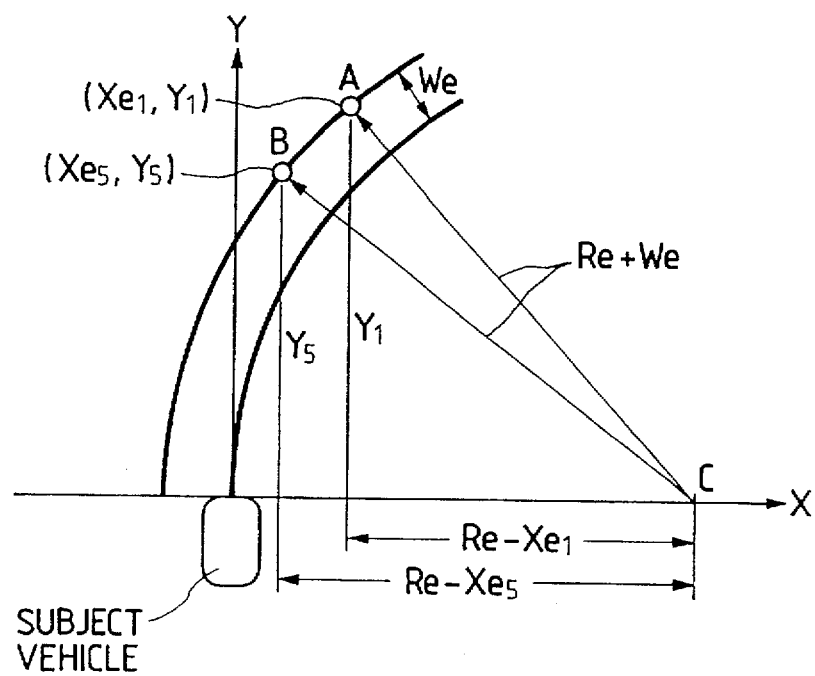
FIG. 13 is a diagram of a curvature radius and correction-resultant positions of an obstacle.

As shown in FIG. 13, the distance Re+We between the curve center "C" and the starting point "A" is equal to the distance Re+We between the curve center "C" and the ending point "B". The starting point "A" has a location (Xe1, Y1). The ending point "B" has a location (Xe5, Y5). Here, "Re" denotes the curvature radius while "We" denotes a clearance between the subject vehicle and the obstacle (the forward object). The distance between the points "A" and "C" which is measured along the X-axis direction is equal to Re−Xe1. The distance between the points "B" and "C" which is measured along the X-axis direction is equal to Re−Xe5. When the Pythagorean theorem is applied, the following two relations are given.

$$Y1^2 + (Re-Xe1)^2 = (Re+We)^2$$

$$Y5^2 + (Re-Xe5)^2 = (Re+We)^2$$

These relations are combined into the following equation.

$$Re = \frac{Y1^2 + Xe1^2 - Y5^2 - Xe5^2}{2(Xe1 - Xe5)}$$

With reference back to FIG. 6, the step S2317 calculates the curvature radius Re by referring to the above-indicated equation.

After the step S2317, the program exits from the curvature radius estimating block S2310.

Figure 14:
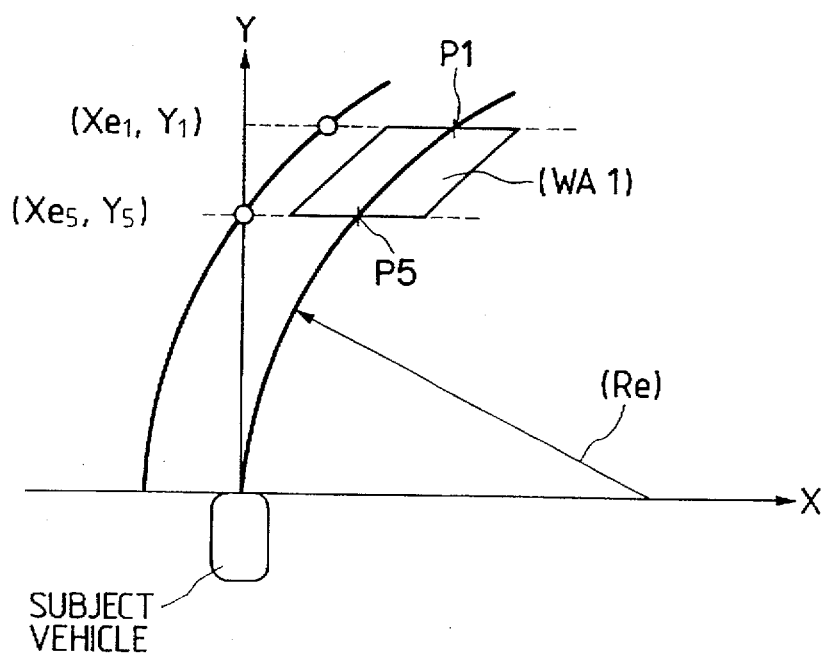
FIG. 14 is a diagram of a curvature radius, correction-resultant positions of an obstacle, and a warning area.

As previously described, the step S2330 in FIG. 5 sets a warning area in response to the curvature radius Re estimated by the block S2310. Specifically, the step S2330 calculates or determines the curve corresponding to the path or the trajectory of the subject vehicle in response to the estimated curvature radius Re. As shown in FIG. 14, two points P1 and P5 are defined which exist on the curve. The locations of the points P1 and P5 are equal to the locations of the starting and ending points (Xe1, Y1) and (Xe5, Y5) in the longitudinal direction of the subject vehicle (the Y-axis direction) respectively. The step S2330 determines transversely-extending partial straight lines centered at the points P1 and P5 which have a length corresponding to the width of the subject vehicle, for example, 2 m. The step S2330 sets the warning area WA1 as a parallelogram defined by the transversely-extending partial straight lines and straight lines connecting the adjacent ends of the transversely-extending partial straight lines. By using approximation based on a parabola, the step S2330 calculates the coordinates (the positions) of the corners of the parallelogram of the warning area WA1 with reference to the following equations.

$$\left(\frac{Y1^2}{2Re}+1, \frac{Y5^2}{2Re}+1\right), \left(\frac{Y1^2}{2Re}+1, \frac{Y5^2}{2Re}-1\right)$$

$$\left(\frac{Y1^2}{2Re}-1, \frac{Y5^2}{2Re}+1\right), \left(\frac{Y1^2}{2Re}-1, \frac{Y5^2}{2Re}-1\right)$$

As previously described, after the step S2330, the program advances to the block S2350 for judging whether a possible collision is present or absent.

Figure 7:
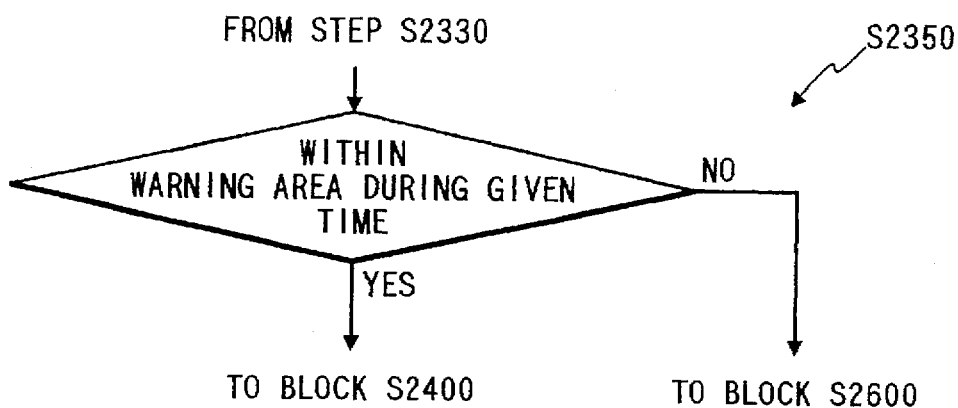
FIG. 7 is a flowchart of the details of a block in FIG. 5.
Figure 15:
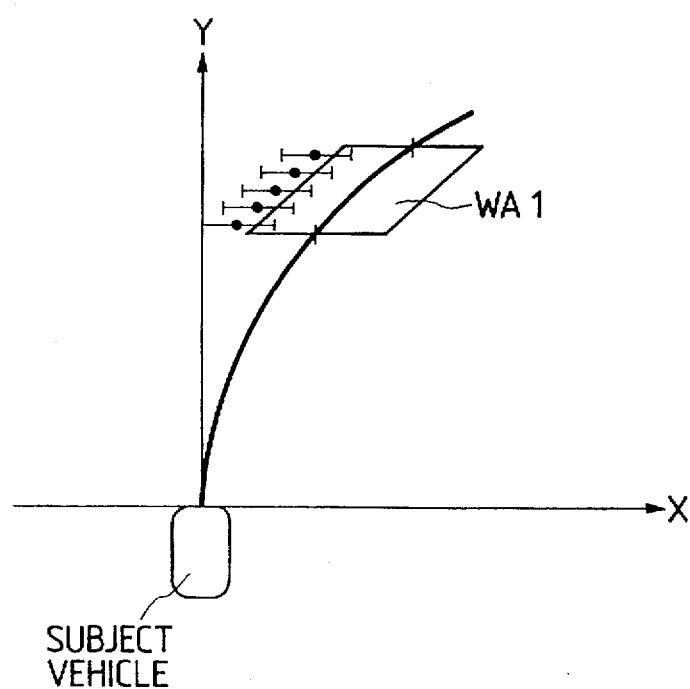
FIG. 15 is a diagram of an estimated path of a subject vehicle, a warning area, and positions of an obstacle.

FIG. 7 shows the details of the possible-collision judgment block S2350. As shown in FIG. 7, the possible-collision judgment block S2350 has a step S2351 which follows the step S2330 in FIG. 5. The step S2351 detects the position of the width of the forward object in response to the output signals of the scanning distance measurement device 5 (see FIGS. 1 and 2). The step S2351 determines whether or not at least a part of the width of the forward object has continuously been in the warning area WA1 for a predetermined time. In the case where at least a part of the width of the forward object has continuously been in the warning area WA1 for the predetermined time as shown in FIG. 15, the step S2351 regards a possible collision as being present. In this case, the program advances from the step S2351 to the block S2400 of FIG. 4. Otherwise, the step S2351 regards a possible collision as being absent, and the program advances from the step S2351 to the block S2600 of FIG. 4.

Figure 8:
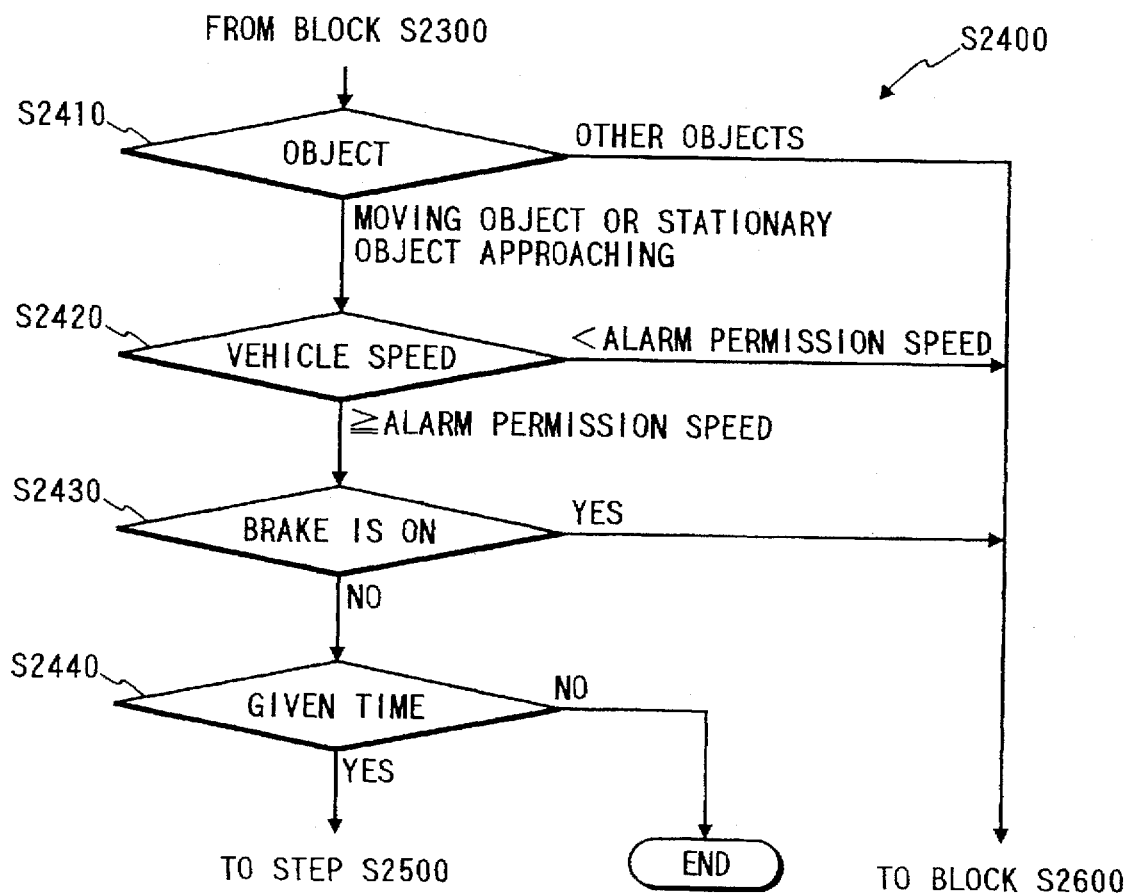
FIG. 8 is a flowchart of the details of a block in FIG. 4.

FIG. 8 shows the details of the wrong alarm prevention block S2400 in FIG. 4. As shown in FIG. 8, the wrong alarm prevention block S2400 has a first step S2410 which follows the collision judgment block S2300 in FIG. 4. The step S2410 determines whether or not the forward object agrees with a stationary object or a moving object relatively approaching the subject vehicle by referring to, for example, the information of the speed of the subject vehicle and the information of the relative speed of the forward object. When the forward object agrees with a stationary object or a moving object relatively approaching the subject vehicle, the program advances from the step S2410 to a step S2430. Otherwise, the program advances from the step S2410 and then exits from the wrong alarm prevention block S2400 before proceeding to the block S2600 in FIG. 4.

The step S2410 serves to prevent the generation of an alarm in the case where the forward object is fixed or moves away from the subject vehicle.

The step S2430 determines whether or not the speed of the subject vehicle is in a predetermined alarm permission range by comparing the vehicle speed with the lower limit of the predetermined alarm permission range. The lower limit of the predetermined alarm permission range is equal to, for example, 20 Km/h. When the speed of the subject vehicle is in the predetermined alarm permission range, the program advances from the step S2430 to a step S2430. Otherwise, the program advances from the step S2430 and then exits from the wrong alarm prevention block S2400 before proceeding to the block S2600 in FIG. 4.

The step S2430 serves to prevent the generation of an alarm in the case where the subject vehicle is drive at a low speed. Such low-speed drive of the subject vehicle tends to be performed in a parking zone.

The step S2430 determines whether or not the brake is currently applied by referring to the output signal of the brake switch 9 (see FIGS. 1 and 2). When the brake is currently applied, the program advances from the step S2430 to a step S2440.

Otherwise, the program advances from the step S2430 and then exits from the wrong alarm prevention block S2400 before proceeding to the block S2600 in FIG. 4.

The step S2430 serves to prevent the generation of an alarm in the case where the brake is applied to the subject vehicle.

When the program enters the step S2440 for the first time, the step S2440 starts a timer to measure the time elapsed therefrom. The step S2440 compares the time elapsed with a preset time equal to, for example, 0.3 sec. In the case where the time elapsed is shorter than the preset time, the program advances from the step S2440 and then exits from the wrong alarm prevention block S2400 before the current execution cycle of the program segment ends. In the case where the time elapsed is equal to or longer than the preset time, the program advances from the step S2440 and then exits from the wrong alarm prevention block S2400 before proceeding to the alarm generating step S2500 in FIG. 4. In other words, the step S2440 determines whether or not the conditions requiring an alarm continue for the preset time.

The step S2440 serves to prevent the generation of a wrong alarm due to noise or other factors which cause a time-domain error.

In the case where the speed of the subject vehicle decreases below the lower limit (for example, 20 Km/h) of the predetermined alarm permission range after an alarm is generated, it is preferable to continue the alarm until the vehicle speed drops to a value smaller than 15 Km/h.

Figure 9:
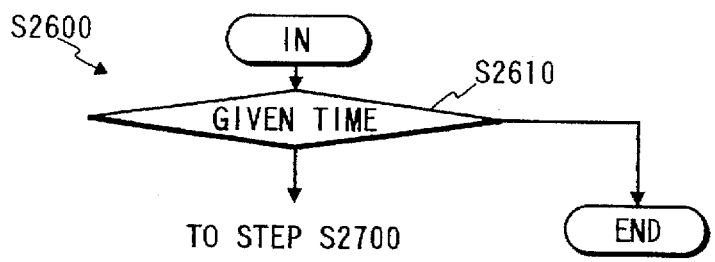
FIG. 9 is a flowchart of the details of a block in FIG. 4.

FIG. 9 shows the details of the wrong alarm prevention block S2600 in FIG. 4. As shown in FIG. 9, the wrong alarm prevention block S2600 has a step S2610 which follows the block S2200, S2300, or S2400 in FIG. 4. When the program enters the step S2610 for the first time, the step S2610 starts a timer to measure the time elapsed therefrom. The step S2610 compares the time elapsed with a preset time. In the case where the time elapsed is shorter than the preset time, the program advances from the step S2610 and then exits from the wrong alarm prevention block S2600 before the current execution cycle of the program segment ends. In the case where the time elapsed is equal to or longer than the preset time, the program advances from the step S2610 and then exits from the wrong alarm prevention block S2600 before proceeding to the alarm stopping step S2700 in FIG. 4. In other words, the step S2610 determines whether or not the conditions requiring stop of an alarm continue for the present time. The step S2610 prevents wrong stop of an alarm due to noise or other factors causing a time-domain error.

Figure 10:
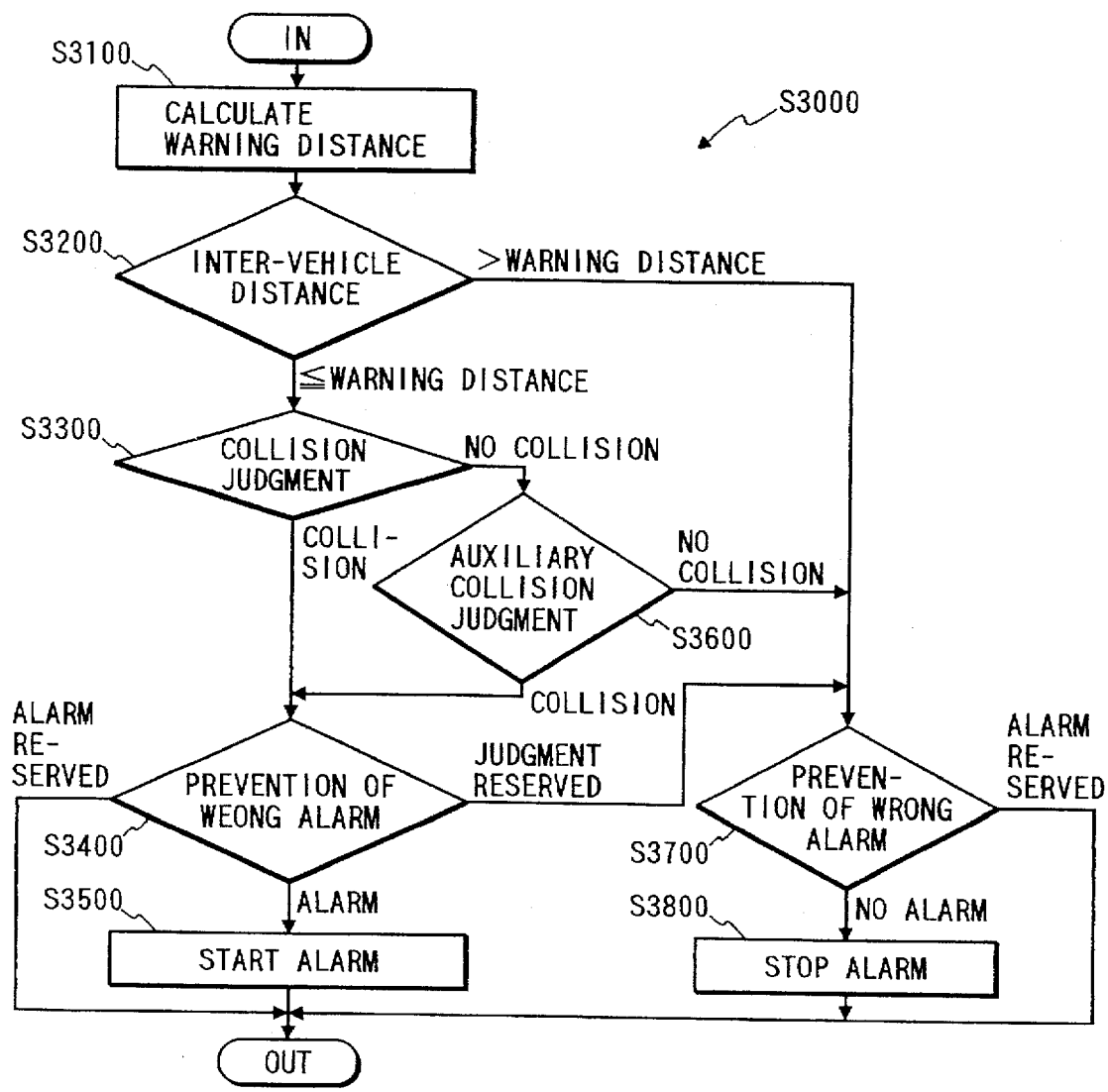
FIG. 10 is a flowchart of the details of a block in FIG. 3.

FIG. 10 shows the details of the moving object warning block S3000 in FIG. 3. The moving object warning block S3000 is similar to the stationary object warning block S2000 in FIG. 3 except for design changes indicated later. As shown in FIG. 10, a first step S3100 of the moving object warning bock S3000, which follows the block S1000 (see FIG. 3), determines a moving object warning distance. The step S3100 is similar to the step S2100 in FIG. 4 except for design changes indicated later. The step S3100 receives the information of the speed of the subject vehicle which is derived from the output signal of the vehicle speed sensor 7. The step S3100 determines the moving object warning distance in response to the speed of the subject vehicle. The determined moving object warning distance varies as a function of the speed of the subject vehicle.

It is preferable to determine the moving object warning distance in consideration of a time lag in the subject vehicle driver's response (a response time of the subject vehicle's driver) regarding the action of the application of the brake, the degree of the application of the brake by the subject vehicle's driver, the threshold distance (the maximum distance) between the subject vehicle and an immediately preceding vehicle at which the subject vehicle's driver starts to have an uneasy feeling, and the degree of the application of the brake by the preceding vehicle's driver which is sensed by the subject vehicle's driver.

It should be noted that an actual distance which will be traveled by the subject vehicle until its stop under the application of the brake depends on the time lag in the subject vehicle driver's response and the degree of the application of the brake. The consideration of the threshold distance (the maximum distance) between the subject vehicle and a immediately preceding vehicle at which the subject vehicle's driver starts to have an uneasy feeling is based on the fact that when another vehicle cuts in with respect to the subject vehicle, the subject vehicle's driver tends to apply the brake to adjust the distance between the subject vehicle and the cut-in vehicle. Such a critical distance depends on the speed of the subject vehicle. The consideration of the degree of the application of the brake by the preceding vehicle's driver, which is sensed by the subject vehicle's driver, is based on the following fact. In the case where the subject vehicle continues to follow another vehicle, the subject vehicle's driver tends to apply the brake when the preceding vehicle is braked. In this case, if an alarm is generated in response to only the speed difference between the subject vehicle and the preceding vehicle, the start of generation of the alarm tends to be delayed.

In addition, the step S3100 derives information of a setting sensitivity or a desired sensitivity from the output signal of the alarm sensitivity setting device 25 (see FIGS. 1 and 2). The subject vehicle's driver can adjust the setting sensitivity (the desired sensitivity) by actuating the alarm sensitivity setting device 25. The step S3100 adjusts the moving object warning distance in response to the setting sensitivity (the desired sensitivity). It is preferable that the moving object warning distance increases as the setting sensitivity (the desired sensitivity) rises.

A step S3200 following the step S3100 derives the distance between the subject vehicle and the forward object from the output signals of the scanning distance measurement device 5. The step S3200 compares the derived distance between the subject vehicle and the forward object with the moving object warning distance determined by the step S3100. When the distance between the subject vehicle and the forward object is equal to or shorter than the moving object warning distance, the program advances from the step S3200 to a block S3300 for executing a main judgment regarding collision. Otherwise, the program advances from the step S3200 to a block S3700 for preventing a wrong alarm.

The block S3300 decides whether or not the subject vehicle will collide with the forward object, that is, whether or not a possible collision is present. In the presence of a possible collision, the program advances from the block S3300 to a block S3400 for preventing a wrong alarm. In the absence of a possible collision, the program advances from the block S3300 to a block S3600 for executing an auxiliary judgment on collision. The block S3300 is similar to the block S2300 in FIG. 4.

The block S3600 decides whether or not the subject vehicle will collide with the forward object, that is, whether or not a possible collision is present. In the presence of a possible collision, the program advances from the block S3600 to the block S3400. Otherwise, the program advances from the block S3600 to the block S3700.

The block S3400 determines whether or not judgment on the generation of an alarm should be reserved. When judgment on the generation of an alarm should be reserved, the program advances from the block S3400 to the block S3700.

In addition, the block S3400 determines whether an alarm should be generated or reserved. When an alarm should be generated, the program advances from the block S3400 to a step S3500. On the other hand, when an alarm should be reserved, the program advances from the block S3400 and exits from the moving object warning bock S3000. The block S3400 is similar to the block S2400 in FIG. 4.

The step S3500 activates the alarm sound generator 13 so that the alarm sound generator 13 will produce an alarm sound. After the step S3500, the program exits from the moving object warning bock S3000.

The block S3700 determines whether or not an alarm should be reserved. When an alarm should be reserved, the program advances from the block S3700 and exits from the moving object warning bock S3000. In addition, the block S3700 determines whether or not an alarm should be stopped. When an alarm should be stopped, the program advances from the block S3700 to a step S3800.

The step S3800 deactivates the alarm sound generator 13 so that the alarm sound generator 13 will stop an alarm sound. After the step S3800, the program exits from the moving object warning bock S3000.

Figure 11:
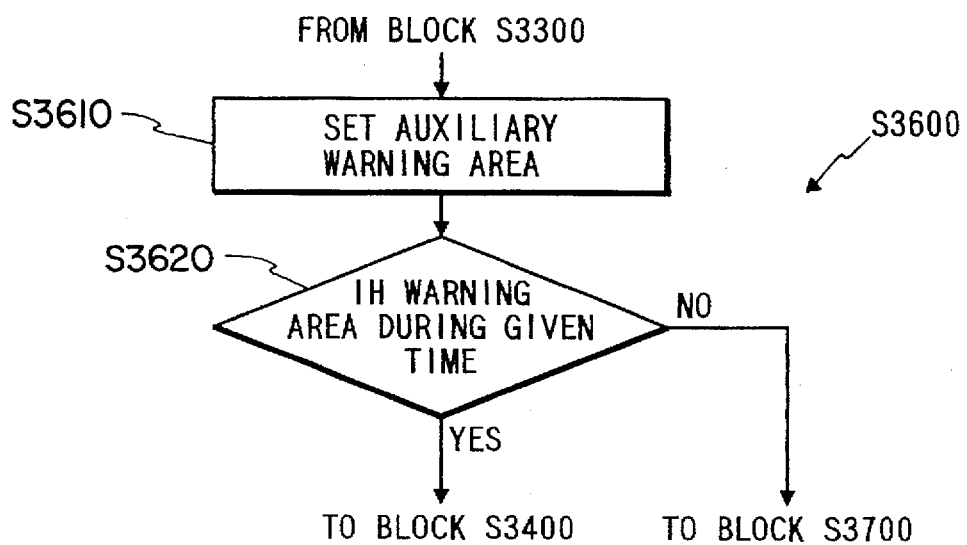
FIG. 11 is a flowchart of the details of a block in FIG. 10.

FIG. 11 shows the details of the auxiliary collision judgment block S3600 in FIG. 10. As shown in FIG. 11, a first step S3610 of the auxiliary collision judgment block S3600 which follows the block S3300 in FIG. 10 sets an auxiliary warning area WA2. A step S3620 following the step S3610 detects the position of the width of the forward object in response to the output signals of the scanning distance measurement device 5 (see FIGS. 1 and 2). The step S3620 determines whether or not at least a part of the width of the forward object has continuously been in the auxiliary warning area WA2 for a predetermined time. In the case where at least a part of the width of the forward object has continuously been in the auxiliary warning area WA2 for the predetermined time, the step S3620 regards a possible collision as being present. In this case, the program advances from the step S3620 to the block S3400 of FIG. 10. Otherwise, the step S3620 regards a possible collision as being absent, and the program advances from the step S3620 to the block S3700 of FIG. 10.

Figure 16:
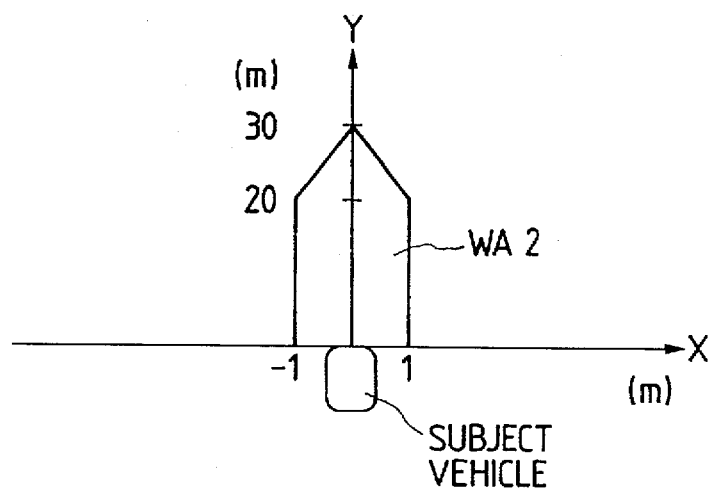
FIG. 16 is a diagram of an auxiliary warning area.
Figure 17:
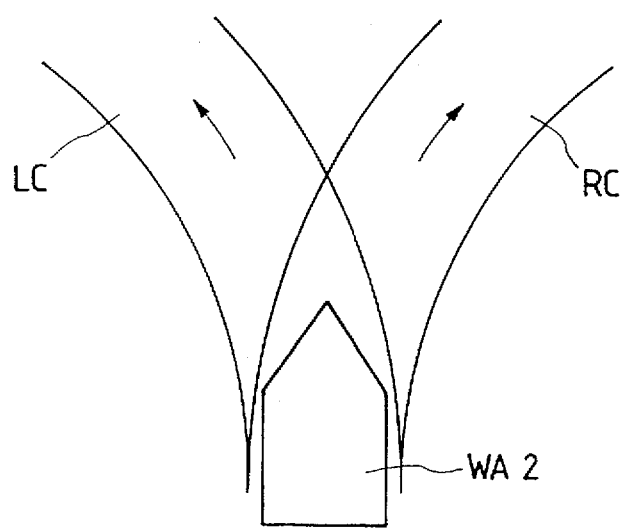
FIG. 17 is a diagram of an auxiliary warning area, and curved paths of a subject vehicle.

The auxiliary warning area WA2 set by the step S3610 in FIG. 11 has, for example, a pentagon shape as shown in FIG. 16. The pentagon shape of the auxiliary warning area WA2 is designed for travel along an express highway. As shown in FIG. 16, the pentagon shape of the auxiliary warning area WA2 extends in front of the subject vehicle. For example, the pentagon shape of the auxiliary warning area WA2 has a width (a transverse length) of 2 m centered with respect to the subject vehicle, a central longitudinal length of 30 m, and a side-edge longitudinal length of 20 m. The auxiliary warning area WA2 is designed in consideration of standards of an express highway and legal limitations on the speeds of vehicles on an express highway. According to one example of standards of an express highway, the radius of a curvature of an express highway is limited to 300 m or more, and each lane has a width of 3.5 m. One example of the legal limitations on the speeds of vehicles on an express highway is 100 Km/h. In addition, the auxiliary warning area WA2 is designed so that collision can be reliably prevented and an alarm can be prevented from occurring with respect to a vehicle traveling along a lane other than the subject vehicle's lane. The reason for shaping the auxiliary warning area WA2 into a pentagon is as follows. The pentagon shape of the auxiliary warning area WA2 can be applied to both the case where the subject vehicle travels along a leftwardly curved path LC and the case where the subject vehicle travels along a rightwardly curved path RC as shown in FIG. 17. In addition, the pentagon shape of the auxiliary warning area WA2 has a greater longitudinal dimension along its central axis and a smaller longitudinal dimension along its side edge.

In the case where the subject vehicle travels along an express highway, the step S3610 in FIG. 11 sets the predetermined auxiliary warning area WA2 of the pentagon shape in FIG. 16 without executing complicated calculation steps. In this case, the setting of the auxiliary warning area WA2 is immediately completed so that the related collision judgment is quickly executed. The quick execution of the collision judgment is advantageous in promptly coping with the case where another vehicle suddenly cuts in with respect to a region immediately ahead of the subject vehicle.

Figure 18:
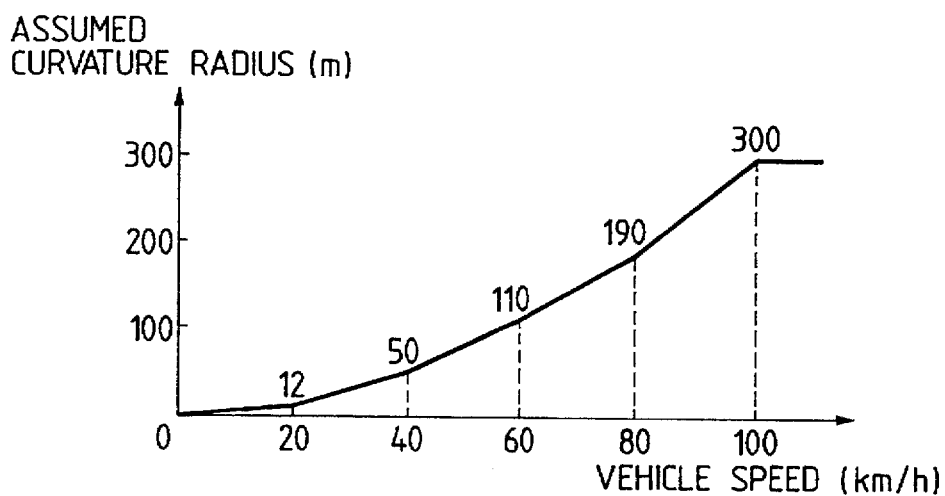
FIG. 18 is a diagram of the relation between an estimated curvature radius and a vehicle speed.
Figure 19:
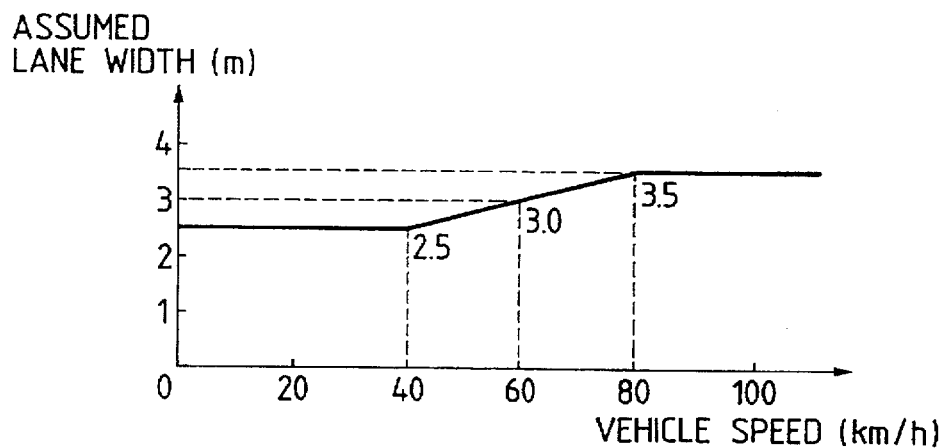
FIG. 19 is a diagram of the relation between an assumed lane width and a vehicle speed.
Figure 20:
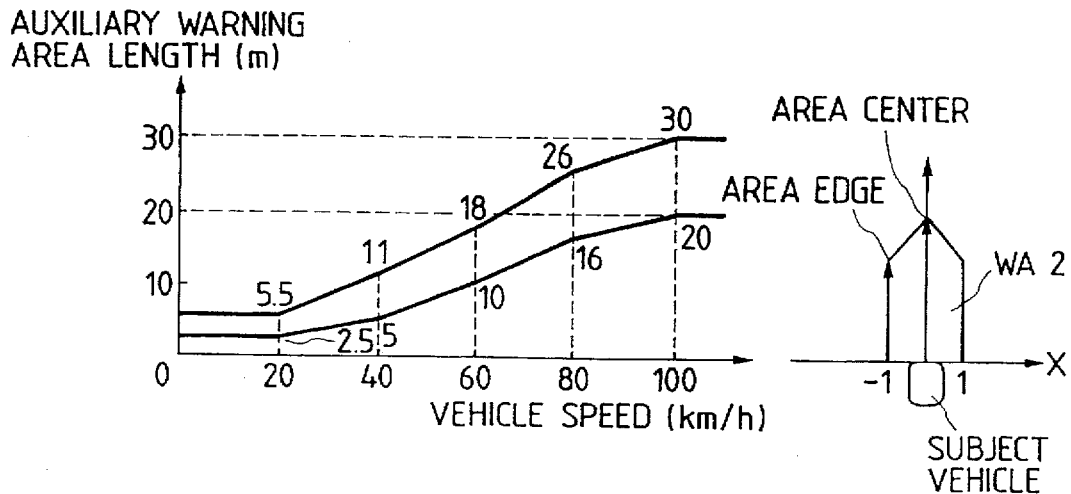
FIG. 20 is a diagram of the relation between dimensions (lengths) of an auxiliary warning area and a vehicle speed.

In the case where the subject vehicle travels along a general road other than an express highway, it is preferable that the step S3610 in FIG. 11 sets an auxiliary warning area other than the auxiliary warning area for the express highway. Usually, the width of every lane in a general road is smaller than the width of every lane in an express highway. Furthermore, in the case of a general road, a vehicle tends to travel near a road side at a low speed. Accordingly, an assumed curvature radius is provided which increases in accordance with an increase in the speed of the subject vehicle as shown in FIG. 18. In addition, an assumed lane width is provided which increases in accordance with an increase in the speed of the subject vehicle as shown in FIG. 19. In the case of a general road, the assumed curvature radius and the assumed lane width are considered, and the dimensions of the auxiliary warning area WA2 of the pentagon shape increase in accordance with an increase in the speed of the subject vehicle as shown in FIG. 20. Specifically, the longitudinal central length and the longitudinal side edge length of the pentagon auxiliary warning area WA2 vary as a function of the speed of the subject vehicle.

It is preferable that the ROM within the control unit 3 in FIGS. 1 and 2 stores a predetermined data table or a predetermined data map providing the relation among the speed of the subject vehicle, the longitudinal central length of the pentagon auxiliary warning area WA2, and the longitudinal side edge length of the pentagon auxiliary warning area WA2. In this case, the step S3610 in FIG. 11 sets the auxiliary warning area WA2 by referring to the predetermined data table or the predetermined data map, and hence the setting of the auxiliary warning area WA2 is easily performed without executing complicated calculation steps.

It is preferable that the step S3610 changes the auxiliary warning area WA2 in accordance with an input signal generated in response to, for example, a vehicle driver's requirement. Specifically, the step S3610 selects one of the auxiliary warning area for an express highway and the auxiliary warning area for a general road in response to such an input signal.

Second Embodiment

A second embodiment of this invention is similar to the previously-mentioned first embodiment except for design changes indicated hereinafter. The second embodiment is designed to cope with the case where one of the left-hand and right-hand reflectors of a preceding vehicle is made invisible by dirt (or dust) and hence the estimation of a curvature radius tends to be inaccurate. The second embodiment includes a block S2315A which replaces the step S2315 in FIG. 6.

Figure 21:
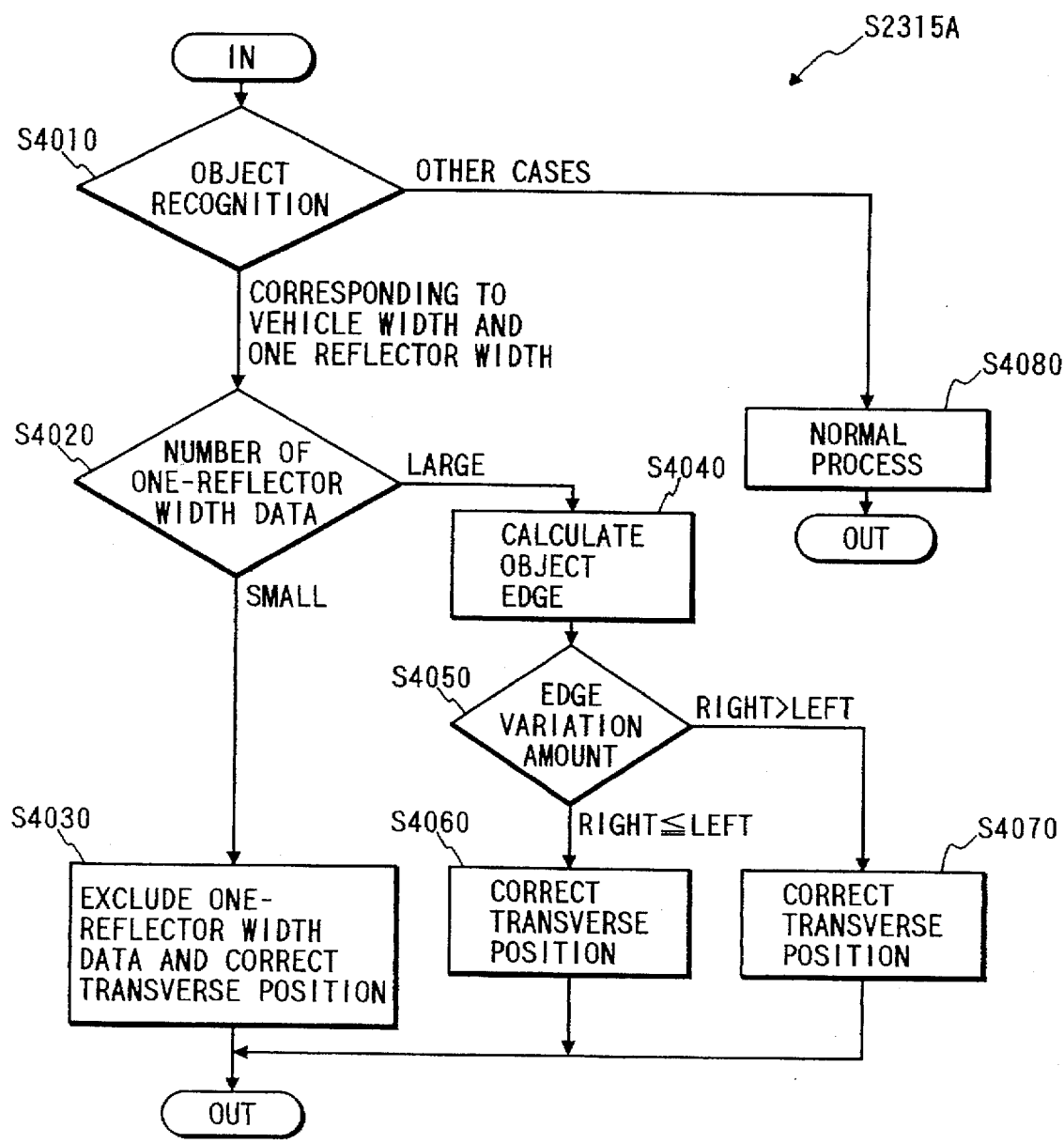
FIG. 21 is a flowchart of the details of a block in a program segment according to a second embodiment of this invention.

FIG. 21 shows the details of the block S2315A. With reference to FIG. 21, a first step S4010 of the block S2315A determines whether or not at least one of the latest and four previous positions of the forward object corresponds to a vehicle width (for example, a width of 1 m or more). In addition, the step S4010 determines whether or not at least one of the latest and four previous positions of the forward object corresponds to a one-reflector width (for example, 0.6 m or less). In the case where at least one of the latest and four previous positions of the forward object corresponds to a vehicle width and also at least one of the latest and four previous positions of the forward object corresponds to a one-reflector width, the program advances from the step S4010 to a step S4020. Otherwise, the program advances from the step S4010 to a step S4080.

The step S4020 determines whether or not the total number of the positions of the forward object which correspond to the one-reflector width, is one. When only one of the positions of the forward object corresponds to the one-reflector width, the program advances from the step S4020 to a step S4030. On the other hand, when at least two of the positions of the forward object correspond to the one-reflector width, the program advances from the step S4020 to a step S4040.

Figure 22:
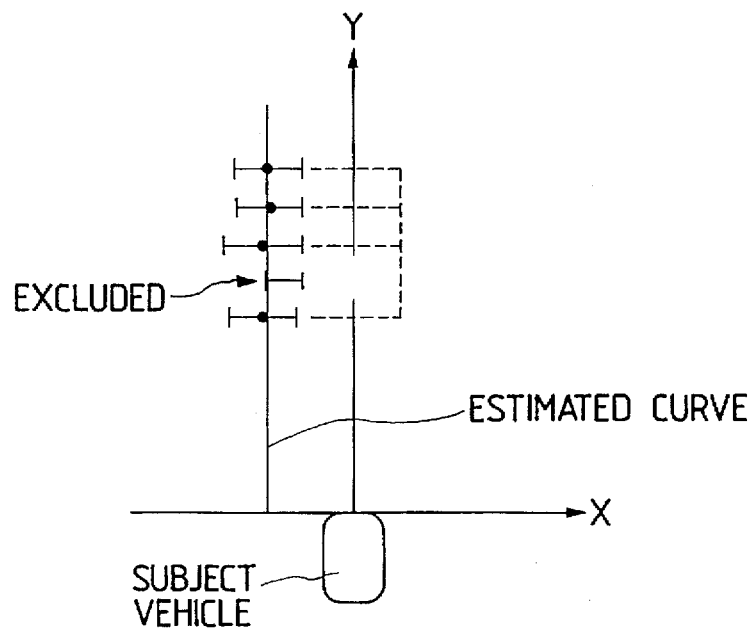
FIG. 22 is a diagram of positions of an obstacle and a subject vehicle.

The step S4030 disregards the position of the forward object which corresponds to the one-reflector width, and corrects the starting point and the ending point of movement of the forward object in response to the other positions (the central positions) of the forward object by using a linear approximation process based on a least square method similarly to the step S2315 in FIG. 6. FIG. 22 shows an example of such conditions. After the step S4020, the program exits from the block S2315A.

The step S4040 calculates the five positions of the left-hand edge and the five positions of the right-hand edge of the forward object. The step S4040 is followed by a step S4050.

The step S4050 calculates the amount of variations among the calculated five positions of the left-hand edge of the forward object, and also the amount of variations among the calculated five positions of the right-hand edge of the forward object. The step S4050 compares the calculated variation amount (the sum of the absolute values representing the five edge positions) related to the left-hand edge and the calculated variation amount (the sum of the absolute values representing the five edge positions) related to the right-hand edge. When the calculated variation amount related to the left-hand edge is equal to or greater than the calculated variation amount related to the right-hand edge, the program advances from the step S4050 to a step S4060. When the calculated variation amount related to the left-hand edge is smaller than the calculated variation amount related to the right-hand edge, the program advances from the step S4050 to a step S4070.

Figure 23:
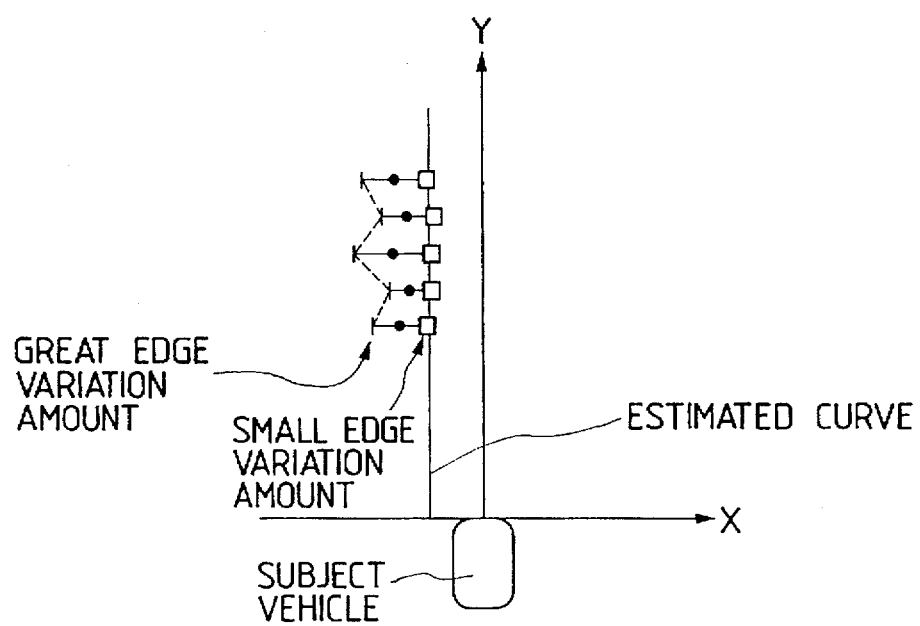
FIG. 23 is a diagram of positions of an obstacle and a subject vehicle.

The step S4060 corrects the starting point and the ending point of movement of the forward object in response to the five positions of the right-hand edge of the forward object by using a linear approximation process based on a least square method. FIG. 23 shows an example of such conditions. After the step S4060, the program exits from the block S2315A.

The step S4070 corrects the starting point and the ending point of movement of the forward object in response to the five positions of the left-hand edge of the forward object by using a linear approximation process based on a least square method. After the step S4070, the program exits from the block S2315A.

The step S4080 corrects the starting point and the ending point of movement of the forward object in response to the five central positions of the forward object by using a linear approximation process based on a least square method similarly to the step S2315 in FIG. 6. After the step S4080, the program exits from the block S2315A.

Third Embodiment

Figure 24:
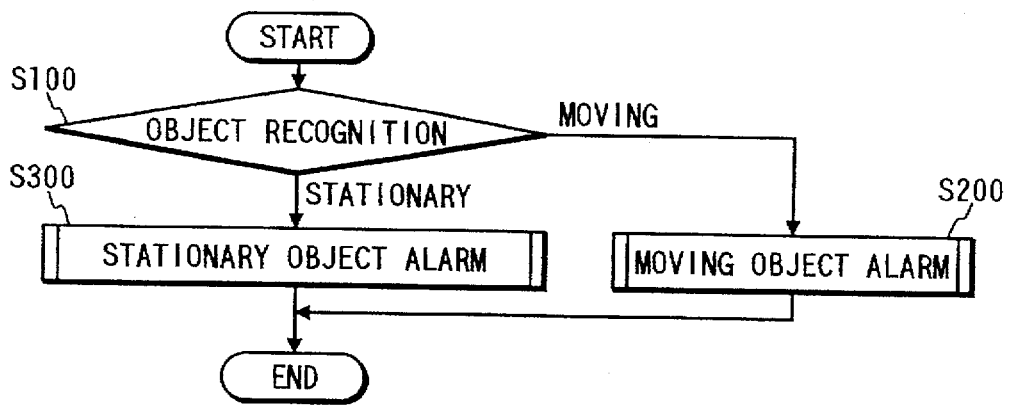
FIG. 24 is a flowchart of a segment of a program according to a third embodiment of this invention.

A third embodiment of this invention is similar to the previously-mentioned first embodiment except for design changes indicated later. In the third embodiment, a control unit 3 (see FIGS. 1 and 2) operates in accordance with a program stored in its internal ROM. When a power supply switch 29 (see FIG. 1) changes from its off position to its on position, the control unit 3 starts to operate. FIG. 24 is a flowchart of an alarm-related segment of the program which is periodically reiterated while the power supply switch 29 remains in the on position.

As shown in FIG. 24, a first block S100 of the alarm-related segment of the program decides the type of a detected forward object, that is, determines whether a detected forward object agrees with a stationary object or a moving object.

Specifically, the block S100 derives the speed of the subject vehicle from the output signal of a vehicle speed sensor 7 (see FIGS. 1 and 2). The block S100 calculates the speed of the forward object relative to the subject vehicle in response to the speed of the subject vehicle and the output signals of a scanning distance measurement device 5 (see FIGS. 1 and 2). The block S100 decides whether or not the forward object is stationary or moving by referring to the speed of the subject vehicle and the relative speed of the forward object. When the forward object is found to be moving, the program advances from the block S100 to a block S200. On the other hand, when the forward object is found to be stationary, the program advances from the block S100 to a block S300.

The blocks S200 and S300 execute a moving object warning process and a stationary object warning process respectively. After the blocks S200 and S300, the current execution cycle of the alarm-related segment of the program ends.

Figure 25:
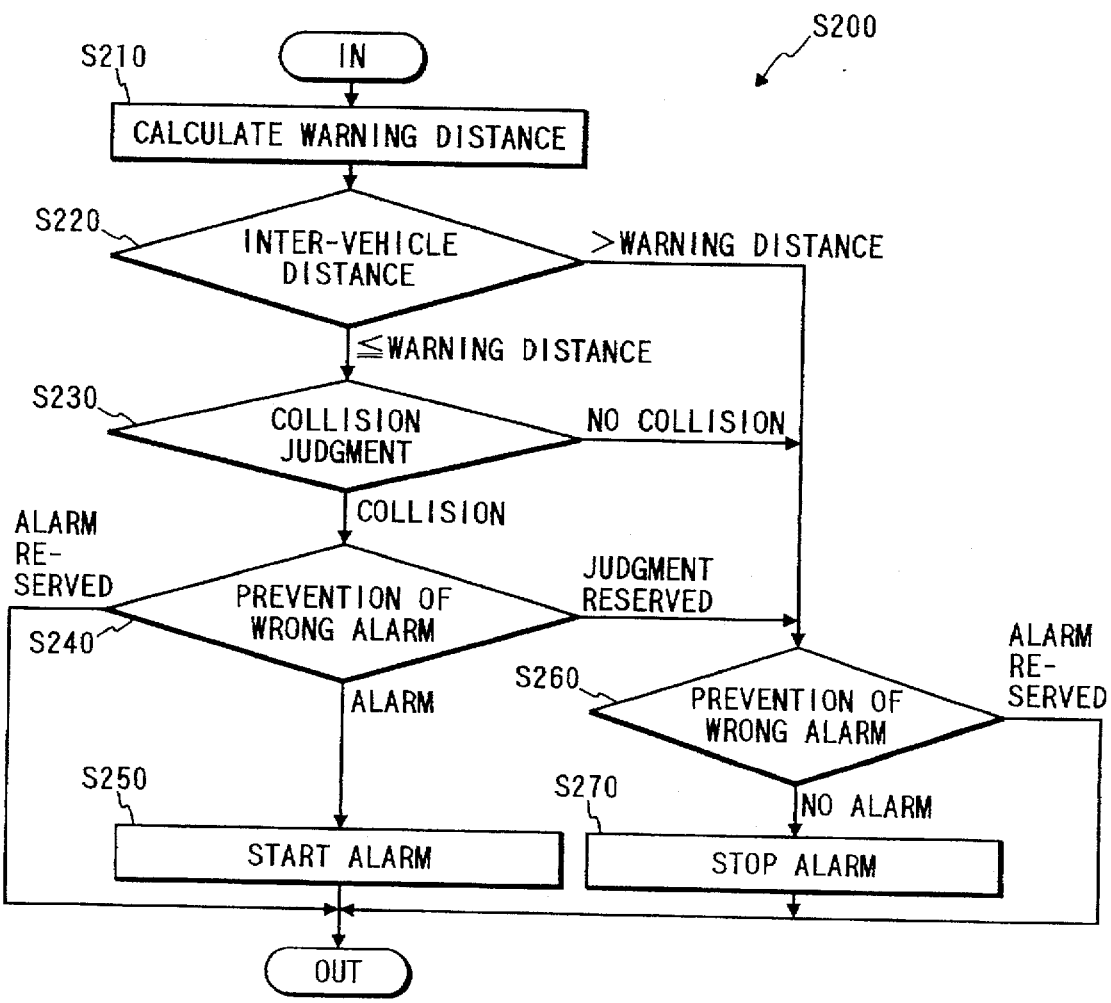
FIG. 25 is a flowchart of the details of a block in FIG. 24.

FIG. 25 shows the details of the moving object warning block S200 in FIG. 24. As shown in FIG. 25, a first step S210 of the moving object warning bock S200 which follows the block S100 (see FIG. 24) determines a moving object warning distance. Specifically, the step S210 receives the information of the speed of the subject vehicle which is derived from the output signal of the vehicle speed sensor 7. The step S210 determines the moving object warning distance in response to the speed of the subject vehicle. The determined moving object warning distance varies as a function of the speed of the subject vehicle.

For example, in the case where the speed of the subject vehicle is equal to or lower than 60 Km/h, the moving object warning distance is set to an estimated distance which will be traveled by the subject vehicle until its stop under the application of a brake to the subject vehicle at a normal degree. In the case where the speed of the subject vehicle exceeds 60 Km/h, the moving object warning distance is set to an estimated distance which will be traveled by the subject vehicle until its stop under the application of the brake to the subject vehicle at a relatively high degree.

It is preferable to determine the moving object warning distance in consideration of a time lag in the subject vehicle driver's response (a response time of the subject vehicle's driver) regarding the action of the application of the brake, the degree of the application of the brake by the subject vehicle's driver, the threshold distance (the maximum distance) between the subject vehicle and a immediately preceding vehicle at which the subject vehicle's driver starts to have an uneasy feeling, and the degree of the application of the brake by the preceding vehicle's driver which is sensed by the subject vehicle's driver.

It should be noted that an actual distance which will be traveled by the subject vehicle until its stop under the application of the brake depends on the time lag in the subject vehicle driver's response and the degree of the application of the brake. The consideration of the threshold distance (the maximum distance) between the subject vehicle and a immediately preceding vehicle at which the subject vehicle's driver starts to have an uneasy feeling is based on the fact that when another vehicle cuts in with respect to the subject vehicle, the subject vehicle's driver tends to apply the brake to adjust the distance between the subject vehicle and the cut-in vehicle. Such a critical distance depends on the speed of the subject vehicle. The consideration of the degree of the application of the brake by the preceding vehicle's driver which is sensed by the subject vehicle's driver is based on the following fact. In the case where the subject vehicle continues to follow another vehicle, the subject vehicle's driver tends to apply the brake when the preceding vehicle is braked. In this case, if an alarm is generated in response to only the speed difference between the subject vehicle and the preceding vehicle, the start of generation of the alarm tends to be delayed.

Generally, such a distance traveled by the subject vehicle varies from vehicle's driver to vehicle's driver. In other words, there is an individual driver difference in such a distance traveled by the subject vehicle. The individual driver difference can be compensated as follows. The step S210 derives information of a setting sensitivity or a desired sensitivity from the output signal of an alarm sensitivity setting device 25 (see FIGS. 1 and 2). The subject vehicle's driver can adjust the setting sensitivity (the desired sensitivity) by actuating the alarm sensitivity setting device 25. The step S210 adjusts the moving object warning distance in response to the setting sensitivity (the desired sensitivity). It is preferable that the moving object warning distance increases as the setting sensitivity (the desired sensitivity) rises.

A step S220 following the step S210 derives the distance between the subject vehicle and the forward object from the output signals of the scanning distance measurement device 5. The step S220 compares the derived distance between the subject vehicle and the forward object with the moving object warning distance determined by the step S210. When the distance between the subject vehicle and the forward object is equal to or shorter than the moving object warning distance, the program advances from the step S220 to a block S230 for executing a judgment on collision. Otherwise, the program advances from the step S220 to a block S260 for preventing a wrong alarm.

The block S230 decides whether or not the subject vehicle will collide with the forward object, that is, whether or not a possible collision is present. In the presence of a possible collision, the program advances from the block S230 to a block S240 for preventing a wrong alarm. In the absence of a possible collision, the program advances from the block S230 to the block S260.

The block S240 determines whether or not judgment on the generation of an alarm should be reserved. When judgment on the generation of an alarm should be reserved, the program advances from the block S240 to the block S260. In addition, the block S240 determines whether an alarm should be generated or reserved. When an alarm should be generated, the program advances from the block S240 to a step S250. On the other hand, when an alarm should be reserved, the program advances from the block S240 and exits from the moving object warning bock S200.

The step S250 activates an alarm sound generator 13 (see FIGS. 1 and 2) so that the alarm sound generator 13 will produce an alarm sound. After the step 3250, the program exits from the moving object warning bock S200.

The block S260 determines whether or not an alarm should be reserved. When an alarm should be reserved, the program advances from the block S260 and exits from the moving object warning bock S200. In addition, the block S260 determines whether or not an alarm should be stopped. When an alarm should be stopped, the program advances from the block S260 to a step S270.

The step S270 deactivates the alarm sound generator 13 so that the alarm sound generator 13 will stop an alarm sound. After the step S270, the program exits from the moving object warning bock S200.

Figure 26:
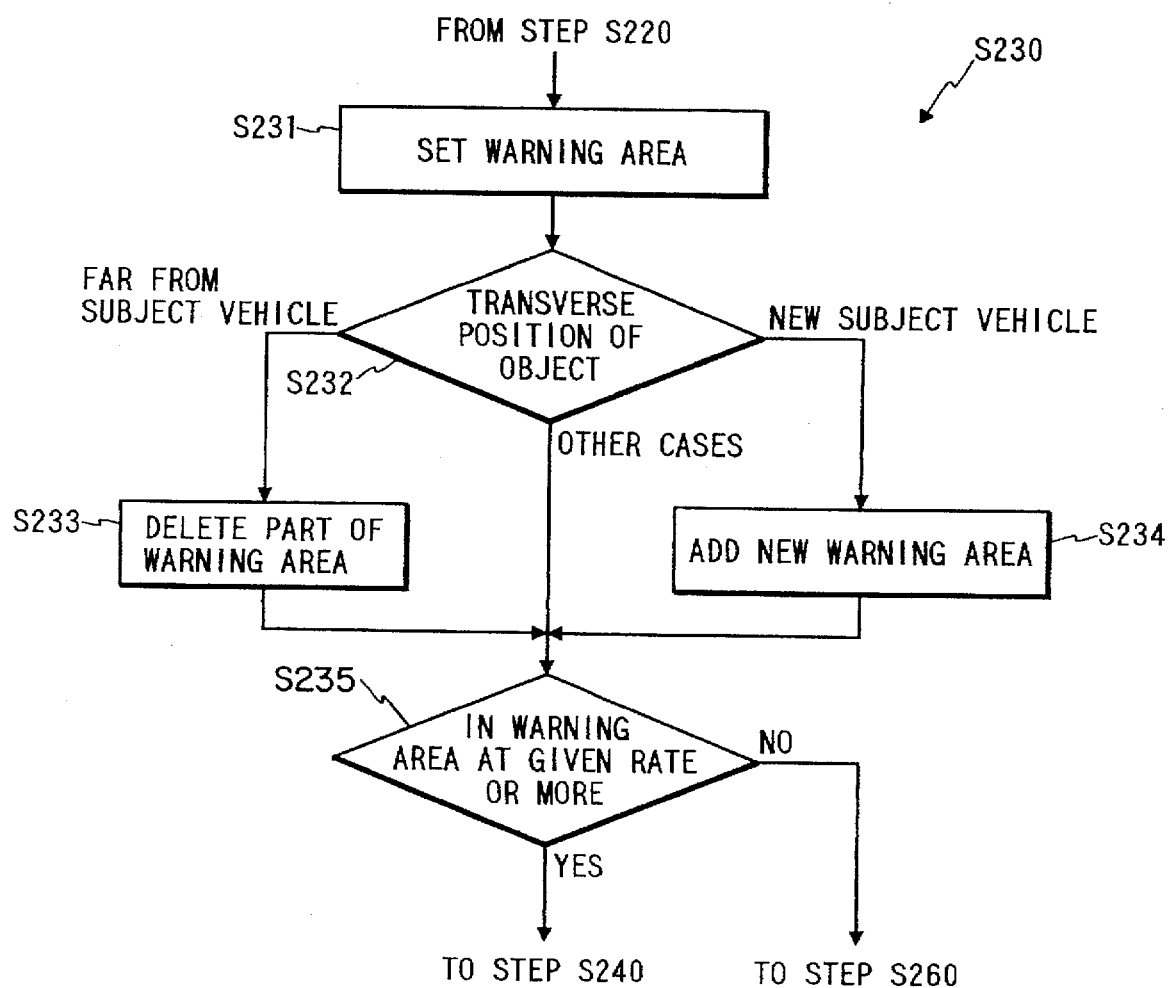
FIG. 26 is a flowchart of the details of a block in FIG. 25.

FIG. 26 shows the details of the collision judgment block S230 in FIG. 25. As shown in FIG. 26, a first step S231 of the collision judgment block S230 which follows the step S220 in FIG. 25 sets a warning area WA.

Figure 27:
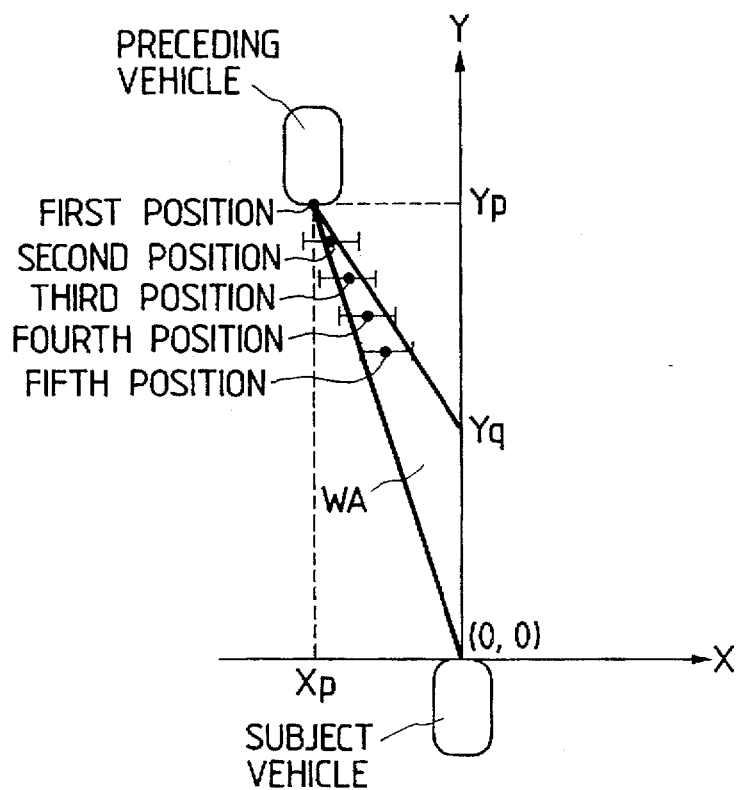
FIG. 27 is a diagram of a warning area and positions of a preceding vehicle and a subject vehicle.

As shown in FIG. 27, the warning area WA has a triangular shape defined by straight lines connecting the origin (0, 0) representative of the position of the subject vehicle, the relative position (Xp, Yp) of the forward object (the obstacle), and a given position (0, Yq) on the Y axis. The given position (0, Yq) on the Y axis is varied as a function of the Y coordinate of the relative position (Xp, Yp) of the forward object (the obstacle).

Figure 28:
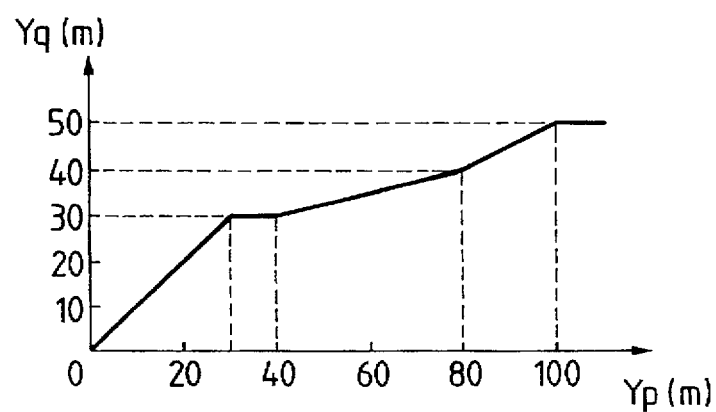
FIG. 28 is a diagram of the relation between distances (lengths) corresponding to points in FIG. 27.

FIG. 28 shows the relation between the positions Yq and Yp. As shown in FIG. 28, the position Yq is set to 50 m when the position Yp corresponds to 100 m or more. The position Yq is set to about a half of the position Yp when the position Yp is in the range of 80 m to 100 m. The position Yq is set to about three fourths of the position Yp when the position Yp is in the range of 40 m to 80 m. The position Yq is set to 30 m when the position Yp is in the range of 30 m to 40 m. The position Yq is set equal to the position Yp when the position Yp corresponds to 30 m or less.

The ROM within the control unit 3 stores a predetermined data table or a predetermined data map providing the relation between the positions Yq and Yp. During the setting of the warning area WA, the step S231 determines the position Yq in response to the position Yp by referring to the predetermined data table or the predetermined data map.

The relation between the positions Yq and Yp, which is shown in FIG. 28, is designed for an express highway where a curvature radius is limited to 300 m or more and a lane width is about 3.5 m. Usually, a general road differs from an express highway in curvature radius, lane width, and allowable highest vehicle speed. Accordingly, it is preferable to set another relation between the positions Yq and Yp for a general road other than an express highway. In this case, the step S231 selects one of the relation for an express highway and the relation for a general road by referring to an input signal generated in response to, for example, a vehicle driver's requirement. Then, the step S231 determines the position Yq in response to the position Yp by referring to the selected relation, and then sets the warning area WA in response to the determined position Yq and the relative position of the forward object (the obstacle).

A step S232 following the step S231 determines whether or not the position of the forward object is in a given narrow range extending along the forward direction of the subject vehicle which starts from the center of the subject vehicle, that is, whether or not the position of the forward object is in a given narrow range directly ahead of the center of the subject vehicle. Specifically, the step 232 compares the absolute value of the X coordinate of the relative position (Xp, Yp) of the forward object with a given larger value, for example, 5 m. When the absolute value of the X coordinate of the relative position (Xp, Yp) of the forward object is equal to or greater than the given larger value, the step S232 regards the forward object as being far from a region directly ahead of the subject vehicle. In this case, the program advances from the step S232 to a step S233. Furthermore, the step 232 compares the absolute value of the X coordinate of the relative position (Xp, Yp) of the forward object with a given smaller value, for example, 1 m. When the absolute value of the X coordinate of the relative position (Xp, Yp) of the forward object is equal to or smaller than the given smaller value, the step S232 regards the forward object as being in or near the region directly ahead of the subject vehicle. In this case, the program advances from the step S232 to a step S234. When the absolute value of the X coordinate of the relative position (Xp, Yp) of the forward object is in the range between the given smaller value and the given larger value, the program advances from the step S232 to a step S235.

Figure 29:
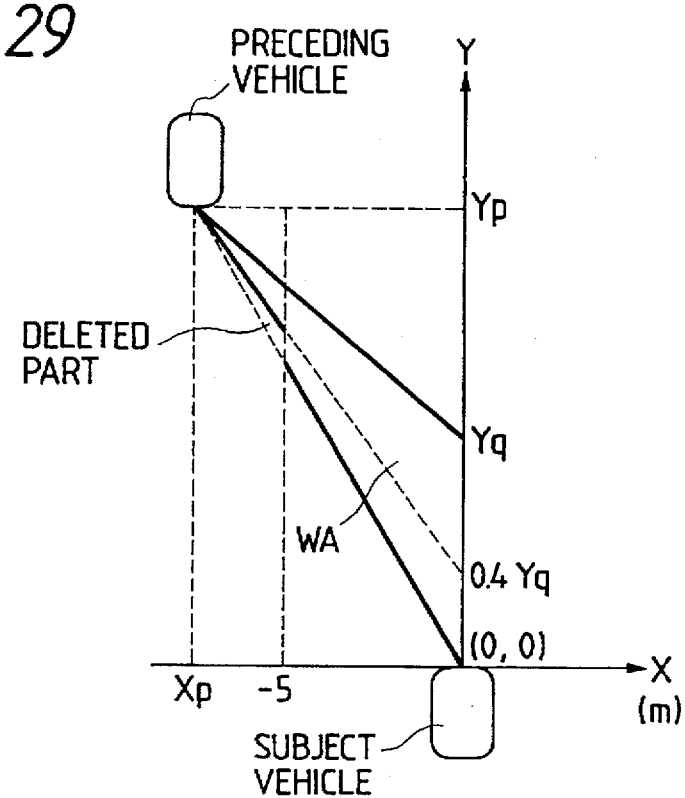
FIG. 29 is a diagram of a warning area, a preceding vehicle, and a subject vehicle.

The step S233 deletes an outer portion from the warning area WA as shown in FIG. 29, and hence contracts the warning area WA and updates the warning area WA. The contraction of the warning area WA is designed to prevent a wrong alarm in the case where the forward object (the forward vehicle) occupies a position transversely far from the region directly ahead of the subject vehicle. Specifically, as shown in FIG. 29, an outer triangle is provided within the warning area WA. The outer triangle is defined by straight lines connecting the origin (0, 0) representative of the position of the subject vehicle, the relative position (Xp, Yp) of the forward object, and a point (0, 0.4Yq) on the Y axis. A part of the outer triangle which has an X coordinate absolute value equal to 5 m or more is deleted from the warning area WA.

Figure 30:
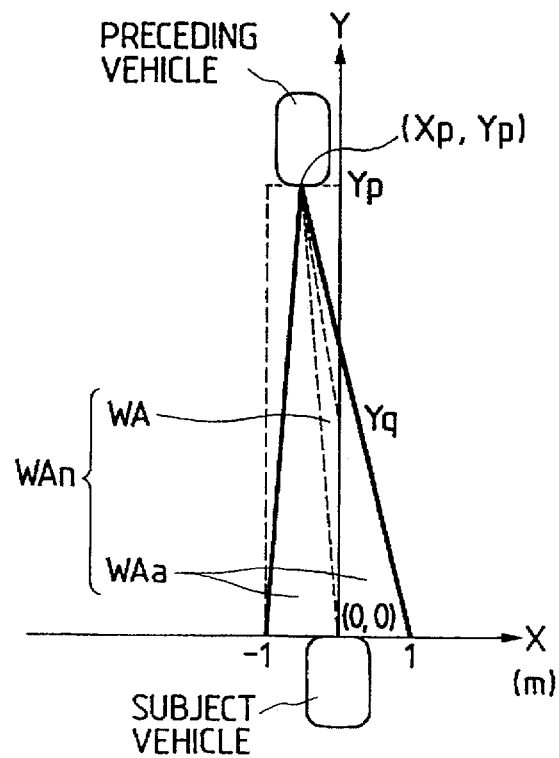
FIG. 30 is a diagram of a warning area, a preceding vehicle, and a subject vehicle.

The step S234 adds a region or regions to the warning area WA as shown in FIG. 30, and hence expands the warning area WA and updates the warning area WA. The expansion of the warning area WA is designed to enable a reliable alarm in the case where the forward object (the forward vehicle) occupies a position in or near the region directly ahead of the subject vehicle. Specifically, as shown in FIG. 30, regions WAa having X coordinate absolute values equal to 1 m or less are added to the warning area WA. The resultant warning area WAn agrees with a triangle defined by straight lines connecting the point (−1, 0) on the X axis, the point (1, 0) on the X axis, and the relative position (Xp, Yp) of the forward object.

A step S235 following the steps S232, S233, and S234 detects the frequency at which the relative position (Xp, Yp) of the forward object is in the warning area WA. The step S235 compares the detected frequency with a given frequency. When the detected frequency is equal to or greater than the given frequency, the step S235 regards a possible collision as being present. In this case, the program advances from the step S235 and then exits from the collision judgment block S230 before entering the step S240 in FIG. 25. When the detected frequency is smaller than the given frequency, the step S235 regards a possible collision as being absent. In this case, the program advances from the step S235 and then exits from the collision judgment block S230 before entering the step S260 in FIG. 25.

Specifically, the warning area WA is set with respect to a first relative position (Xp, Yp) of the forward object. The step S235 detects whether or not each of four later relative positions (Xp, Yp) of the forward object is in the warning area WA. The step S235 counts up the later relative positions (Xp, Yp) of the forward object which are in the warning area WA. The step S235 determines whether or not the total number of the later relative positions (Xp, Yp) of the forward object in the warning area WA is smaller than three. When the total number of the later relative positions (Xp, Yp) of the forward object in the warning area WA is equal to or greater than three, the program advances from the step S235 to the step S240 in FIG. 25. When the total number of the later relative positions (Xp, Yp) of the forward object in the warning area WA is smaller than three, the program advances from the step S235 to the step S260 in FIG. 25.

Figure 31:
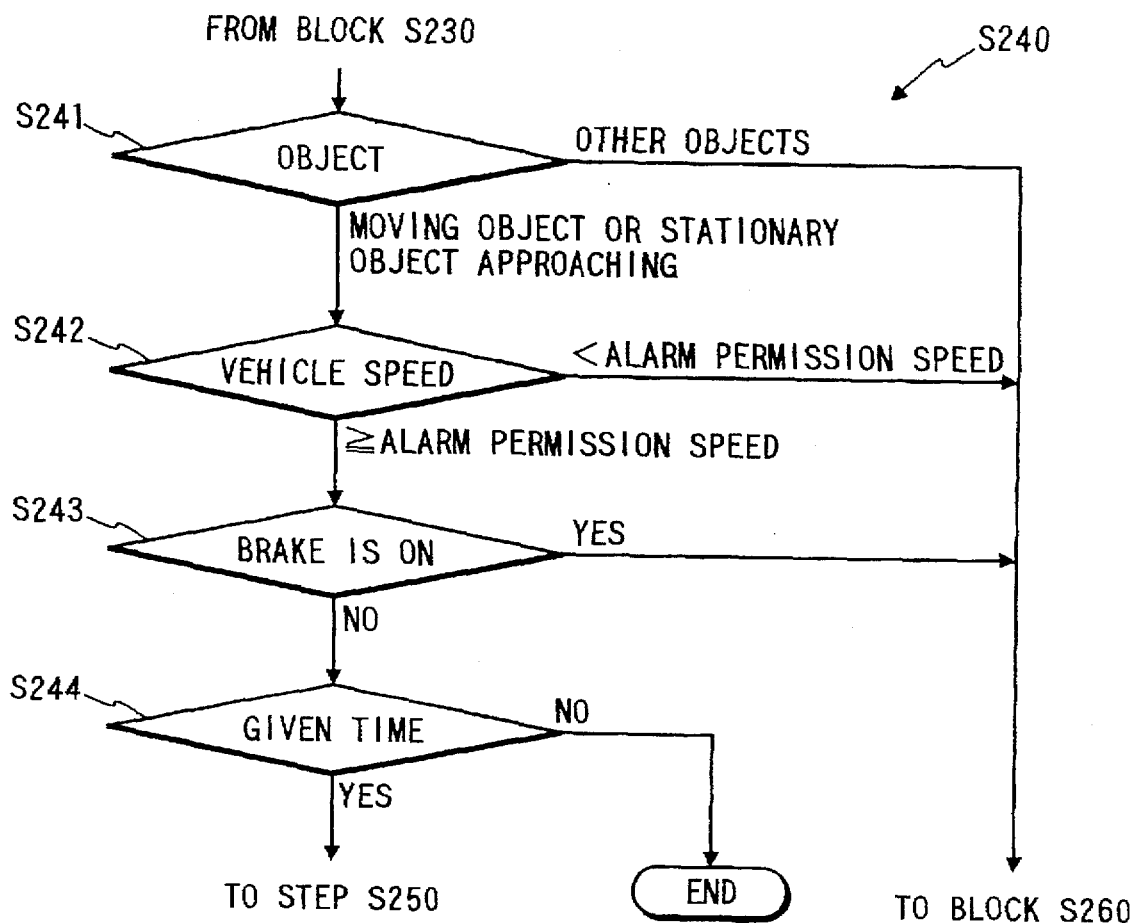
FIG. 31 is a flowchart of the details of a block in FIG. 25.

FIG. 31 shows the details of the wrong alarm prevention block S240 in FIG. 25. As shown in FIG. 31, the wrong alarm prevention block S240 has a first step S241 which follows the collision judgment block S230 in FIG. 25. The step S241 determines whether or not the forward object agrees with a moving object relatively approaching the subject vehicle by referring to, for example, the information of the speed of the subject vehicle and the information of the relative speed of the forward object. When the forward object agrees with a moving object relatively approaching the subject vehicle, the program advances from the step S241 to a step S243. Otherwise, the program advances from the step S241 and then exits from the wrong alarm prevention block S240 before proceeding to the block S260 in FIG. 25.

The step S241 serves to prevent the generation of an alarm in the case where the forward object is fixed relative to the subject vehicle or moves away from the subject vehicle.

The step S243 determines whether or not the speed of the subject vehicle is in a predetermined alarm permission range by comparing the vehicle speed with the lower limit of the predetermined alarm permission range. The lower limit of the predetermined alarm permission range is equal to, for example, 20 Km/h. When the speed of the subject vehicle is in the predetermined alarm permission range, the program advances from the step S242 to a step S243. Otherwise, the program advances from the step S242 and then exits from the wrong alarm prevention block S240 before proceeding to the block S260 in FIG. 25.

The step S242 serves to prevent the generation of an alarm in the case where the subject vehicle is drive at a low speed. Such low-speed drive of the subject vehicle tends to be performed in a parking zone.

The step S243 determines whether or not the brake is currently applied by referring to the output signal of a brake switch 9 (see FIGS. 1 and 2). When the brake is currently applied, the program advances from the step S243 to a step S244. Otherwise, the program advances from the step S243 and then exits from the wrong alarm prevention block S240 before proceeding to the block S260 in FIG. 25.

The step S243 serves to prevent the generation of an alarm in the case where the brake is applied to the subject vehicle.

When the program enters the step S244 for the first time, the step S244 starts a timer to measure the time elapsed therefrom. The step S244 compares the time elapsed with a preset time equal to, for example, 0.3 sec. In the case where the time elapsed is shorter than the preset time, the program advances from the step S244 and then exits from the wrong alarm prevention block S240 before the current execution cycle of the program segment ends. In the case where the time elapsed is equal to or longer than the preset time, the program advances from the step S244 and then exits from the wrong alarm prevention block S240 before proceeding to the alarm generating step S250 in FIG. 25. In other words, the step S244 determines whether or not the conditions requiring an alarm continue for the preset time.

The step S244 serves to prevent the generation of a wrong alarm due to noise or other factors which cause a time-domain error.

In the case where the speed of the subject vehicle decreases below the lower limit (for example, 20 Km/h) of the predetermined alarm permission range after an alarm is generated, it is preferable to continue the alarm until the vehicle speed drops to a value smaller than 15 Km/h.

Figure 32:
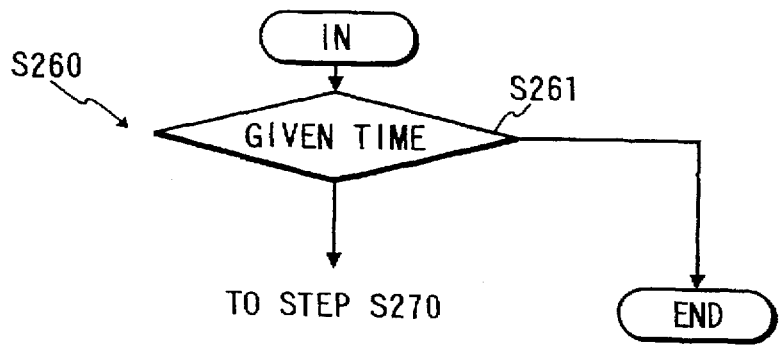
FIG. 32 is a flowchart of the details of a block in FIG. 25.
Figure 33:
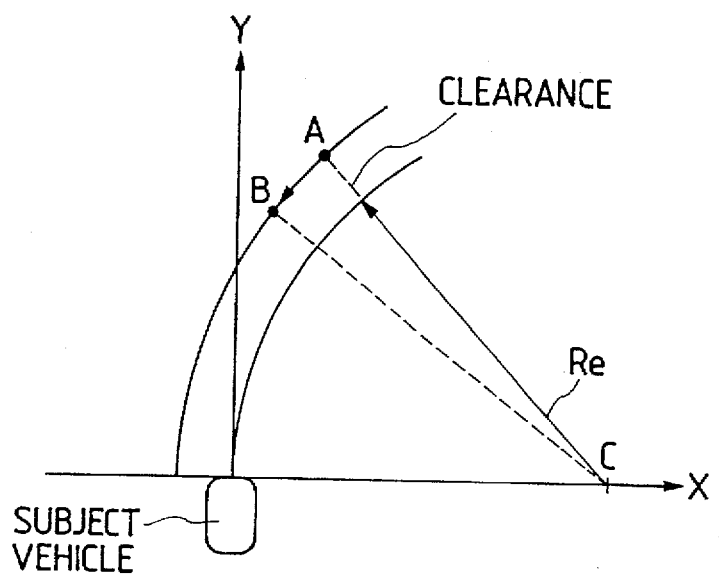
FIG. 33 is a diagram of a curvature radius and positions of an obstacle and a subject vehicle.
Figure 34:
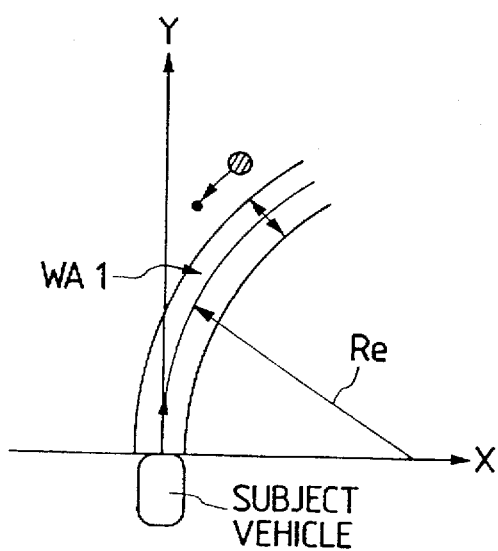
FIG. 34 is a diagram of a curvature radius and positions of an obstacle and a subject vehicle.
Figure 35:
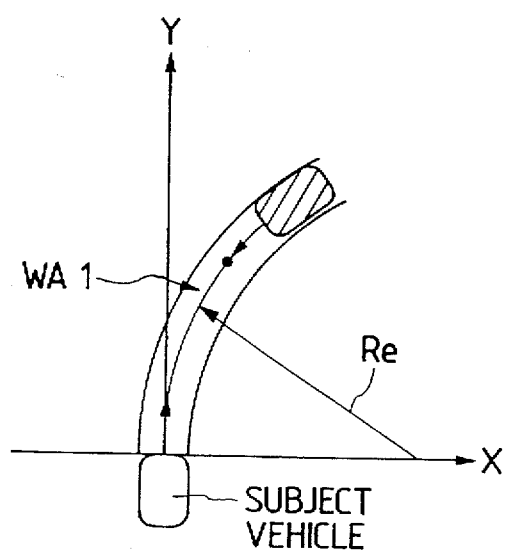
FIG. 35 is a diagram of a curvature radius and positions of an obstacle and a subject vehicle.
Figure 36:
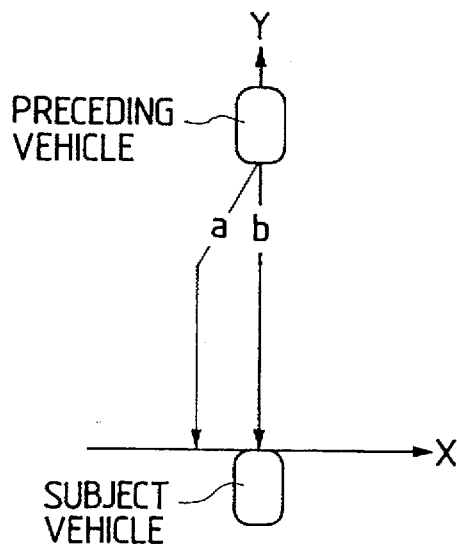
FIG. 36 is a diagram of a preceding vehicle, a subject vehicle, and paths of the preceding vehicle relative to the subject vehicle.
Figure 37:
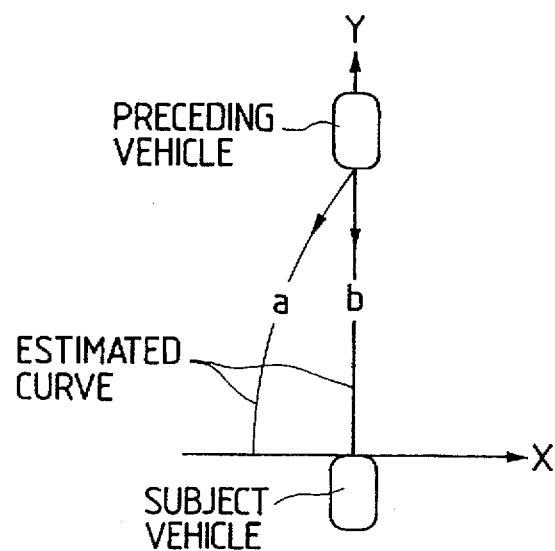
FIG. 37 is a diagram of a preceding vehicle, a subject vehicle, and estimated curves which correspond to the paths in FIG. 36.
Figure 38:
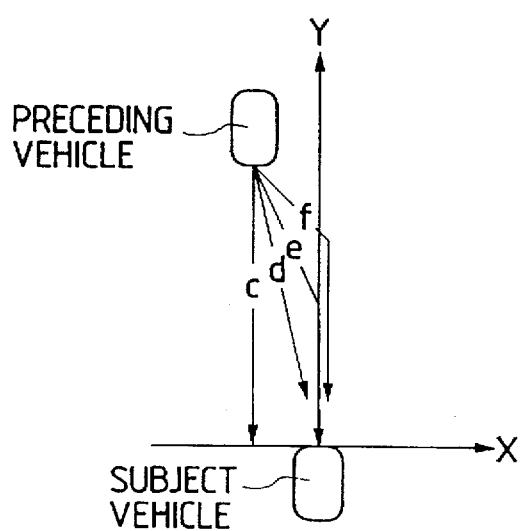
FIG. 38 is a diagram of a preceding vehicle, a subject vehicle, and paths of the preceding vehicle relative to the subject vehicle.
Figure 39:
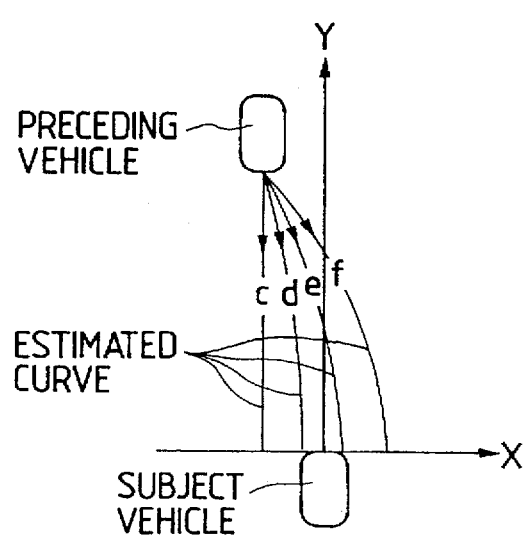
FIG. 39 is a diagram of a preceding vehicle, a subject vehicle, and estimated curves which correspond to the paths in FIG. 38.
Figure 40:
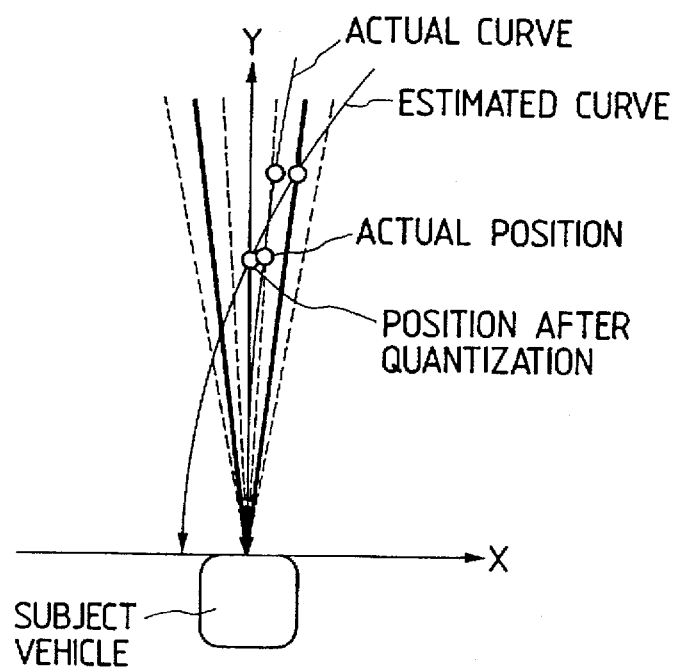
FIG. 40 is a diagram of positions of an obstacle, an estimated curve, an actual curve, a subject vehicle, and paths of a beam emitted from the subject vehicle.
Figure 41:
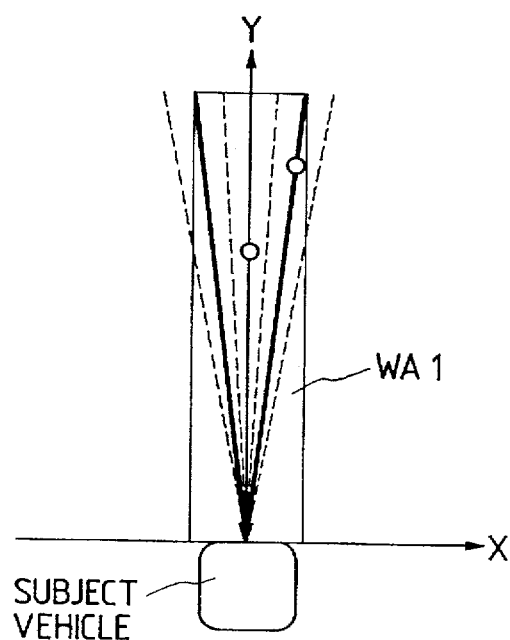
FIG. 41 is a diagram of positions of an obstacle, a subject vehicle, and paths of a beam emitted from the subject vehicle.
Figure 42:
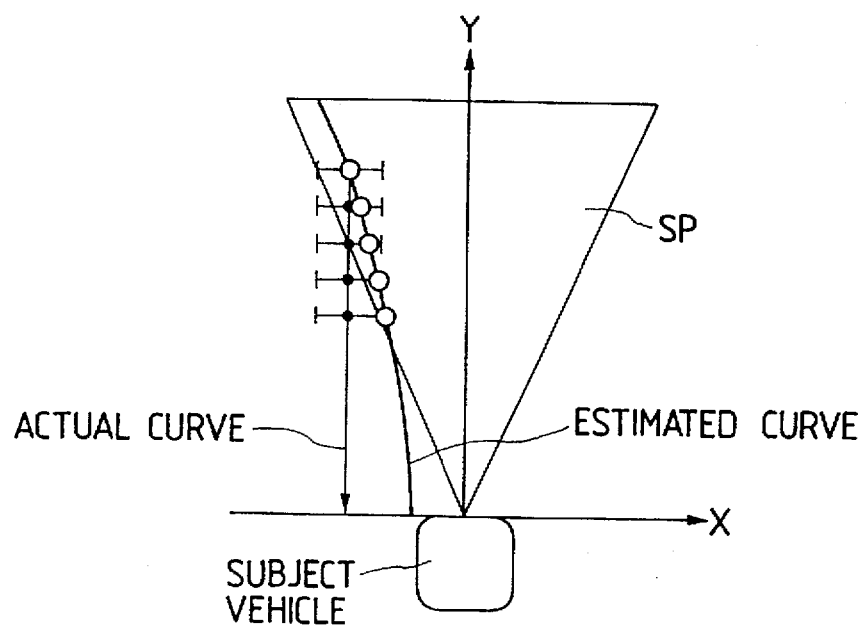
FIG. 42 is a diagram of a scan area, positions of an obstacle, an estimated curve, and a subject vehicle.
Figure 43:
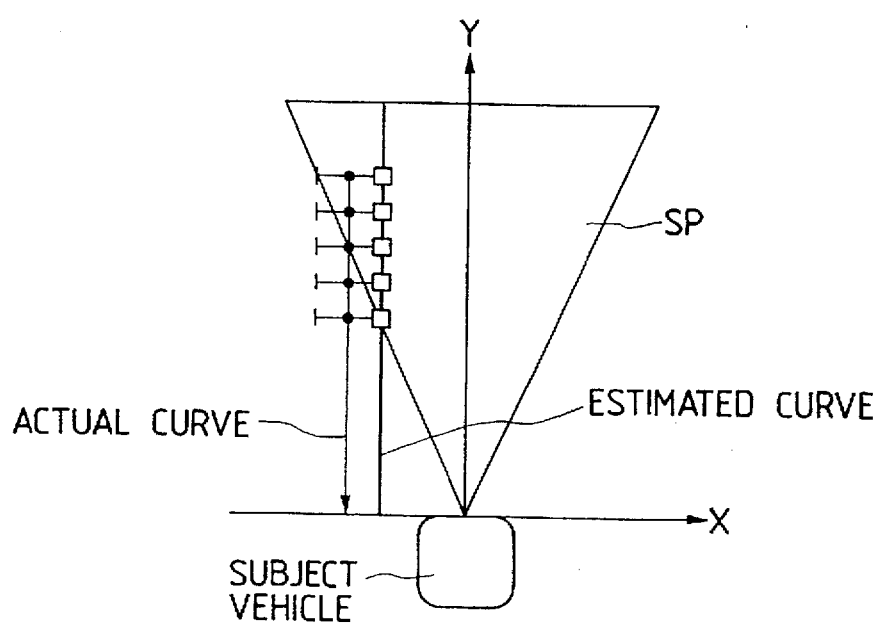
FIG. 43 is a diagram of a scan area, positions of an obstacle, an estimated curve, and a subject vehicle.
Figure 44:
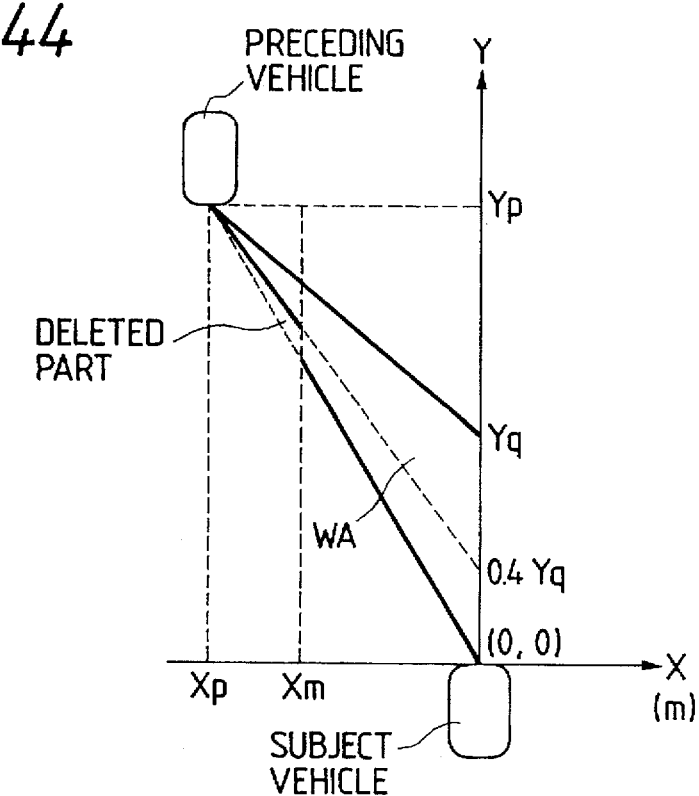
FIG. 44 is a diagram of a warning area, a preceding vehicle, and a subject vehicle.
Figure 45:
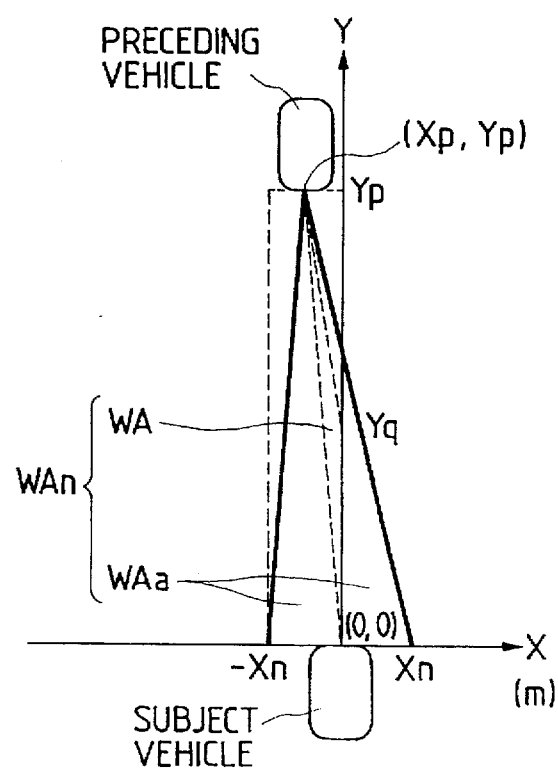
FIG. 45 is a diagram of a warning area, a preceding vehicle, and a subject vehicle.

FIG. 32 shows the details of the wrong alarm prevention block S260 in FIG. 25. As shown in FIG. 32, the wrong alarm prevention block S260 has a step S261 which follows the block S220, S230, or S240 in FIG. 25. When the program enters the step S261 for the first time, the step S261 starts a timer to measure the time elapsed therefrom. The step S261 compares the time elapsed with a preset time. In the case where the time elapsed is shorter than the preset time, the program advances from the step S261 and then exits from the wrong alarm prevention block S260 before the current execution cycle of the program segment ends. In the case where the time elapsed is equal to or longer than the preset time, the program advances from the step S261 and then exits from the wrong alarm prevention block S260 before proceeding to the alarm stopping step S270 in FIG. 25. In other words, the step S261 determines whether or not the conditions requiring stop of an alarm continue for the preset time. The step S261 prevents wrong stop of an alarm due to noise or other factors which cause a time-domain error.

The stationary object warning block S300 in FIG. 24 is similar to the previously-mentioned moving object warning block S200 except for design changes indicated hereinafter. A step in the stationary object warning block S300 which corresponds to the step S210 (see FIG. 25) in the moving object warning block S200 determines a stationary object warning distance. A step in the stationary object warning block S300 which corresponds to the step S220 (see FIG. 25) in the moving object warning block S200 compares the distance between the subject vehicle and the forward object with the stationary object warning distance.

It is preferable to determine the stationary object warning distance in consideration of both a time lag in the subject vehicle driver's response (a response time of the subject vehicle's driver) regarding the action of the application of the brake and the degree of the application of the brake by the subject vehicle's driver. It should be noted that an actual distance which will be traveled by the subject vehicle until its stop under the application of the brake depends on the time lag in the subject vehicle driver's response and the degree of the application of the brake.

What is claimed is:

1. An obstacle warning system for a vehicle, comprising:
   distance measuring system for emitting a reflectable signal at a given angular range in a width-wise direction of the vehicle in a scanning manner and for detecting a distance between the vehicle and a movable obstacle in correspondence with a scan angle based on a reflection of the reflectable signal from the obstacle;
   relative position calculating means for calculating a relative position of the movable obstacle with respect to the vehicle based on the distance detected by the distance measuring means and a corresponding scan angle;

radius calculating means for calculating a radius of an estimated relative curved path of the vehicle with respect to the movable obstacle based on relative positions of at least two points of the movable obstacle which are calculated by the relative position calculating means;

warning area setting means for setting a given warning area based on the width of the vehicle and the radius calculated by the radius calculating means; and first warning means for executing a first warning process responsive to the movable obstacle remaining in the warning area for a predetermined period of time.

2. The obstacle warning system of claim 1, wherein the radius calculating means comprises means for calculating the radius of the estimated relative curved path of the vehicle based on two correction-resultant relative positions which are derived from relative positions of at least three points of the movable obstacle.

3. The obstacle warning system of claim 1, further comprising straight travel assuming means for regarding a straight traveling condition as being present responsive to an amount of movement of the movable obstacle relative to the vehicle in the direction of the width of the vehicle no greater than a first predetermined value and responsive to the movable obstacle being in a predetermined area directly in front of the vehicle based on relative positions of at least two points of the movable obstacle which are calculated by the relative position calculating means;

wherein in cases where the straight travel assuming means regards a straight traveling condition as being present, the radius calculating means regards the radius as being infinite without executing a normal radius calculating process while the warning area setting means sets the given warning area based on the infinite radius and the width of the vehicle.

4. The obstacle warning system of claim 1, wherein in cases where at least a part of the movable obstacle moves with respect to the vehicle from a given angular range which can be scanned by the distance measuring system to a region outside the given angular range, the relative position of the movable obstacle is calculated by the relative position calculating means as being a position corresponding to an edge of the movable obstacle closer to the vehicle before at least a part of the movable obstacle moves relative to the vehicle to the region outside the given angular range.

5. The obstacle warning system of claim 1, wherein in cases where a width of the movable obstacle which is recognized based on the relative position thereof corresponds to a given vehicle width and corresponds to a width of a vehicle reflector, the radius calculating unit calculates the radius of the estimated curved path based on data corresponding to the width of the vehicle reflector.

6. The obstacle warning system of claim 1, further comprising:

vehicle speed detecting means for detecting a speed of the vehicle;

relative speed calculating unit for calculating a relative speed of the movable obstacle with respect to the vehicle based on the relative position calculated by the relative position calculating means;

motion judgment means for judging whether the movable obstacle is moving based on the relative speed of the movable obstacle and the speed of the vehicle; and second warning means for executing a second warning process responsive to the motion judgment means determining that the movable obstacle is moving and has remained in an auxiliary warning area set with respect to the vehicle for a given time, even if the first warning process based on the warning area is not executed by the first warning means.

7. The obstacle warning system of claim 6, wherein the auxiliary warning area is set with respect to the vehicle based on a standard vehicle speed assumed in consideration of a road shape.

8. A warning system for a vehicle, comprising:

first means for periodically detecting a position of a movable obstacle relative to the vehicle;

second means for estimating a trajectory of the vehicle relative to the movable obstacle in response to the position of the obstacle periodically detected by the first means;

third means for calculating a radius of a curvature of the trajectory estimated by the second means;

fourth means for setting a warning area in response to the radius calculated by the third means;

fifth means for detecting whether the position of the movable obstacle periodically detected by the first means remains in the warning area set by the fourth means during a predetermined period of time;

sixth means for generating an alarm responsive to the fifth means determining that the position of the movable obstacle has remained in the warning area for the predetermined period of time; and seventh means for inhibiting generation of an alarm responsive to the fifth means determining that the position of the obstacle has not remained in the warning area for the predetermined period of time.

9. An obstacle warning system for a vehicle, comprising:

a distance measuring system emitting a reflectable signal of a given angular range in a width-wise direction of the vehicle in a scanning manner and detecting a distance between the vehicle and a movable obstacle in correspondence with a scan angle based on a reflection of the reflectable signal from the obstacle;

a relative position calculating unit calculating a relative position of the movable obstacle with respect to the vehicle based on the distance detected by the distance measuring system and a corresponding scan angle;

radius calculating unit calculating a radius of an estimated relative curved path of the vehicle with respect to the movable obstacle based on relative positions of at least two points of the movable obstacle calculated by the relative position calculating unit;

warning area setting unit setting a given warning area based on the width of the vehicle and the radius calculated by the radius calculating unit; and warning system executing a given warning process responsive to the movable obstacle remaining in the warning area for a predetermined period of time.

* * * * *